US008141223B2

(12) United States Patent
Taniguchi et al.

(10) Patent No.: US 8,141,223 B2

(45) Date of Patent: Mar. 27, 2012

(54) CELL PRODUCTION METHOD AND CELL PRODUCTION FACILITY

(75) Inventors: Takao Taniguchi, Toyota (JP); Shigeharu Ikeda, Kariya (JP); Kuniyuki Hashimoto, Nisio (JP); Junji Sugawara, Nagoya (JP)

(73) Assignee: Aisin AW Co., Ltd., Aichi (JP)

( * ) Notice: Subject to any disclaimer, the term of this patent is extended or adjusted under 35 U.S.C. 154(b) by 1113 days.

(21) Appl. No.: 11/791,476

(22) PCT Filed: Dec. 22, 2005

(86) PCT No.: PCT/JP2005/023679

§ 371 (c)(1), (2), (4) Date: Jan. 10, 2008

(87) PCT Pub. No.: WO2006/068253

PCT Pub. Date: Jun. 29, 2006

(65) Prior Publication Data

US 2008/0189927 A1 Aug. 14, 2008

(30) Foreign Application Priority Data

Dec. 24, 2004 (JP) ................................ 2004-374179

(51) Int. Cl.
*B21D 39/00* (2006.01)
*B23P 21/00* (2006.01)

(52) U.S. Cl. ................ 29/429; 29/430; 29/783; 29/784; 29/791; 29/794; 29/822; 29/823; 29/824

(58) Field of Classification Search ................ 29/897.2, 29/429, 430, 469, 783, 784, 791, 794, 822, 29/823, 824, 281.1, 281.4, 281.5
See application file for complete search history.

(56) References Cited

FOREIGN PATENT DOCUMENTS

| | | | |
|---|---|---|---|
| DE | 40 20 286 | A1 | 1/1992 |
| EP | 0 718 179 | A1 | 6/1996 |
| GB | 2 361 904 | A | 11/2001 |
| JP | 52586/1978 | U | 5/1978 |
| JP | 58-010603 | A | 1/1983 |
| JP | 60-033173 | A | 2/1985 |
| JP | 61-100329 | A | 5/1986 |
| JP | 2-83816 | U | 6/1990 |
| JP | 7-33056 | A | 2/1995 |
| JP | 8-47818 | A | 2/1996 |
| JP | 2000-281209 | A | 10/2000 |
| JP | 2003-251575 | A | 9/2003 |
| JP | 2004-230485 | A | 8/2004 |
| JP | 2005-182388 | A | 7/2005 |

*Primary Examiner* — Jermie Cozart

(74) *Attorney, Agent, or Firm* — Sughrue Mion, PLLC

(57) ABSTRACT

A cell manufacturing method in which a main operator, who carries out main operations that include a plurality of steps in which parts are attached to a workpiece, is moved along with the workpiece so as to transit a plurality of stations at which auxiliary steps related to the main operations are carried out. A main car is provided on which the workpiece is mounted and on which the main operator rides. A main operation platform apparatus is also provided that has a main operation platform for carrying out the main operations so as to be movable are used, and then when carrying out at least a portion of the main operations in the main car, the main car and the main operation platform are moved in synchrony. Furthermore, a subsidiary car is provided to travel together with the main car so as to be able to transfer parts and/or jigs.

23 Claims, 16 Drawing Sheets

OPERATION STEPS OVERVIEW LIST

| MAIN OPERATION | | SUBSIDIARY OPERATION | |
|---|---|---|---|
| SYMBOL | NAME | SYMBOL | NAME |
| ML1 | B2 PISTON AND SNAP RING ASSEMBLED | SL1 | B2 ASSEMBLY ASSEMBLED |
| ML2 | REAR SUB-ASSEMBLY ASSEMBLED | SL2 | REAR SUB-ASSEMBLY ASSEMBLED |
| ML3 | B2 BRAKE PLATE THICKNESS MEASURED AND B2 BACKING PLATE SELECTED | | |
| ML4 | B2 BACKING PLATE AND SNAP RING ASSEMBLED | SL4 | SNAP RING PREPARED |
| ML5 | F1 ONE-WAY CLUTCH AND SNAP RING ASSEMBLED | SL5 | ONE-WAY CLUTCH AND SNAP RING PREPARED |
| ML6 | CENTER SUPPORT AND COUNTER GEAR ASSEMBLY ASSEMBLED | SL6 | COUNTER GEAR ASSEMBLY ASSEMBLED |
| ML7 | COUNTER GEAR INCLINATION MEASURED | | |
| ML8 | DRIVE PINION ASSEMBLY ASSEMBLED FOR THE DIFF | SL8 | 1) DRIVE PINION ASSEMBLY ASSEMBLED 2) DIFF ASSEMBLY ASSEMBLED |
| ML9 | FRONT ASSEMBLY DRIVE SUN GEAR AND B-1 BAND BRAKE ASSEMBLED | SL9 | FRONT SUB-ASSEMBLY ASSEMBLED |
| ML10 | OIL PUMP ASSEMBLY BOLT TIGHTENED | SL10 | OIL PUMP ASSEMBLY ASSEMBLED |
| ML11 | END PLAY MEASURED | | |
| ML12 | B1 BAND BRAKE STROKE MEASURED | | |
| ML13 | B1 PISTON ASSEMBLY ASSEMBLED | | |

CELL PRODUCTION METHOD AND CELL PRODUCTION FACILITY

TECHNICAL FIELD

Exemplary embodiments of the present invention relate to a cell manufacturing method in which substantially one operator carries out a plurality of operation steps on one workpiece, and relate to a cell manufacturing facility.

BACKGROUND ART

One method of manufacturing products is what is termed a line production method, which uses a conveyor belt. In this line production method, a plurality of stations is provided along a conveyor line, and at each station, there is an operator positioned with manufacturing equipment, tools, parts, materials and the like. In addition, workpieces are conveyed in sequence by a conveyor belt, prescribed operating steps are carried out at the respective stations, and the product is thereby manufactured. While this line production method is suitable for mass production, a large capital expenditure is necessary, and when the product specifications are changed, this method cannot readily and flexibly respond.

In recent years, in order to respond to the diversification of consumer needs and the like in the field of automobile production and electrical equipment production, the need to manufacture many models in small lots has been increasing. In place of the line production method, a cell manufacturing method, in which one operator carries out a plurality of operation steps, is gradually coming into use as a production method that is suitable for this small-scale production of many models. In the cell manufacturing method, there are the advantages that the response to product specification changes is facilitated and capital expenditures can be reduced. In addition, from the point of view of the operator, the method will be embraced willingly because there is an awareness that the product has been completed by himself.

Patent Document 1: Japanese Patent Application Publication No. JP-A-2003-251575, for example, discloses an example of a cell manufacturing method in which a workpiece is mounted on a hand-pushed operating car, and operations are carried out while the car transits the plurality of stations. In addition, a means to raise and lower the workpiece is provided, and improvements in productivity and a reduction in the operator fatigue can be realized.

However, in the cell manufacturing method of Patent Document 1, while the operating car is in motion, the operation steps do not proceed, and it cannot be said that the productivity is sufficient. Thus, a significant increase in efficiency and a reduction in production lead time can be expected. Furthermore, there are cases in which parts that are pre-assembled by combining component parts are necessary, and the problems of eliminating storage space and the labor for managing these parts remain. In addition, when one operator carries out all operation steps, including the operations for the sub-assembly, the number of stations becomes too large, the movement distance is drastically increased, and the content of the operation is complex. Thus, there are cases in which this cannot be adopted as a suitable production method.

In consideration of these circumstances, aspects of the present invention provide a cell manufacturing method and a cell manufacturing facility that significantly increases the productivity beyond that of the related art, can reduce production lead time, minimizes the amount of parts requiring storage, and distributes the operation steps among a plurality of operators.

SUMMARY OF THE INVENTION

An aspect of the present invention is to provide a cell manufacturing method in which a main operator, who carries out main operations that include a plurality of steps in which parts are installed on a workpiece, is moved along with the workpiece so as to transit a plurality of stations in which auxiliary steps related to the main operations are carried out by providing a main car on which the workpiece is mounted and on which a main operator rides, and that travels automatically on a predetermined travel route that transits the plurality of stations; and providing a main operation platform apparatus that is a kind of station that is provided so as to be able to move a main operation platform for carrying out the main operations; then when at least a portion of the main operations are carried out in the main car, the main car and the main operation platform are moved in synchrony.

It will be appreciated that, in the present specification, for convenience, a facility that has a function in which auxiliary steps related to the main operations are carried out is called a "station". Examples of a "station" include a station at which an auxiliary step is carried out wherein a workpiece is loaded on an operation car, a station at which an auxiliary step is carried out wherein a workpiece is unloaded from an operation car, a station at which an auxiliary step is carried out wherein parts to be attached to the workpiece are supplied, a station at which an auxiliary step is carried out wherein tools (jigs) that are used in an operation are supplied, a station at which an auxiliary step is carried out in which predetermined processing is carried out after the workpiece has been received from an operation car, and the like. As an example, the main delivery apparatus and the subsidiary delivery apparatus described below, are one type of station.

A cell manufacturing method according to an aspect of the present invention provides a main operation platform apparatus, and as described above, the main operation platform apparatus can be made to move in synchrony with the main car. Thus, even in the case of a main operation that is difficult to carry out only on a main car, the main operation can be carried out while moving by using the main operation platform that moves in synchrony with the main car. Thereby, it is possible to realize a cell manufacturing more smoothly.

In addition, the cell manufacturing method uses a subsidiary car on which a subsidiary operator can ride, the subsidiary operator carrying out subsidiary operations in which parts and/or jigs that are necessary for the main operations are prepared; and the main car and the subsidiary car travel together so as to be able to transfer parts and/or jigs between the main car and the subsidiary car. In this case, it is possible to implement the cell manufacturing method more efficiently In addition, the main car and the subsidiary car can be made to travel together by becoming extremely close so that the transfer of the parts and/or jigs between the main car and the subsidiary car can be carried out carried out directly between the main operator of the main car and the subsidiary operator of the subsidiary car. In addition, it is possible to make the main car and the subsidiary car travel together such that the transfer of the parts and/or jigs is not carried out directly between the main operator and the subsidiary operator in this manner, but is carried out via a separately provided transfer apparatus, which is a type of station.

Note that the subsidiary operations may include operations in which the parts are assembled by combining and pre-assembling component parts. In addition, the subsidiary operations may include operations in which the parts are set in jigs and operations in which the component parts are set in jigs.

Thus, by introducing the subsidiary car, it is possible to divide the operation steps into the main operations and the subsidiary operations and to carry out these operations at the same time.

In the case in which the subsidiary car is introduced, at least two operators may be used: a person who carries out the main operations on the main car and a person who carries out the subsidiary operations on the subsidiary car.

In the main operations, the principal operation steps that bring the assembly of the product to completion are carried out. Note that the concept of a "product" in the present specification is not limited to the finished product that is used by what is referred to as the end user, but includes all single items that are assembled by a plurality of sequences of operations, such as products that are parts that are incorporated into these finished products.

In addition, the main operations are not simply general assembly operations in which parts are incorporated, but may also include inspection operations in which, for example, the dimensions of the finished product are confirmed or the operational status is confirmed. A portion of the tools that are used in the main operations are provided in the main car, and the remainder can be provided at each station. In addition, among the members and parts that are used in a main operation, those necessary for preparatory operations can be received from a subsidiary car, and the others can be supplied from each of the stations. Small parts such as screws may be provided in the main car.

In subsidiary operations, the preparation of parts and jigs that are required in the main operation is carried out. In the subsidiary operation, composite parts (referred to as "assemblies" in the embodiments) may be assembled by combining and pre-assembling component parts. In addition, the parts or component parts can be set on a jig and then transferred to the main operation. The tools, members, and parts that are used in the subsidiary operation can be prepared in advance at each of the stations or on the subsidiary cars.

In the case in which a subsidiary car is introduced, the main operations and the subsidiary operations described above may proceed by being carried out at the same time on two cars that travel together. Thereby, because the operation steps have been divided and carried out, it is possible to reduce the manufacturing lead time. In addition, because the parts that have been assembled in the subsidiary operation are used immediately in a main operation, the need to temporarily store these parts is eliminated.

In addition, in the case in which a subsidiary car is introduced, furthermore, a subsidiary operation platform apparatus that is a kind of station can be provided so as to be able to move the subsidiary operation platform for carrying out subsidiary operations is used, and when at least a portion of the subsidiary operations is carried out in the subsidiary car, the subsidiary car and the subsidiary operation platform are made to move in synchrony.

As explained above, the subsidiary operation platform apparatus moves the subsidiary operation platform in synchrony with the subsidiary car. Thus, even in the case of subsidiary operation that is difficult to carry out only on a subsidiary car, the subsidiary operation can be carried out while moving by using the subsidiary operation platform that moves in synchrony with the main car. Thereby, the cell manufacturing can be carried out more smoothly even in the case in which the subsidiary car has been introduced.

In addition, in the case in which the subsidiary car is introduced, a method may be used in which cell manufacture is carried out in which only a subsidiary operation platform apparatus is provided, and the main operation platform apparatus is not provided.

Specifically, an exemplary embodiment of a cell manufacturing method, in which a main operator, who carries out main operations that include a plurality of steps in which parts are attached to a workpiece, is moved along with the workpiece so as to transit a plurality of stations in which auxiliary steps related to the main operations are carried out, is characterized by using:

a main car on which a workpiece is mounted and on which the main operator rides, and that automatically travels on a predetermined travel route that transits the plurality of stations;

a subsidiary car on which a subsidiary operator rides, the subsidiary operator carrying out subsidiary operations in which parts and/or jigs that are necessary for the main operations are prepared; and a subsidiary operation platform apparatus that is a type of station that is provided so as to be able to move a subsidiary operation platform for carrying out the subsidiary operations;

then when at least a portion of the subsidiary operations are carried out in the subsidiary car, the subsidiary car and the subsidiary operation platform are made to travel in synchrony, and the main car and the subsidiary car travel together so as to be able to transfer parts and/or jigs between the main car and the subsidiary car.

In order to actually carry out the cell manufacturing method of the present invention, it is possible to use the exemplary cell manufacturing facility that is explained below.

Specifically, a cell manufacturing facility wherein a main operator, who carries out main operations that include a plurality of steps in which parts are installed on a workpiece, is moved along with the workpiece so as to transit a plurality of stations at which auxiliary steps related to the main operation are carried out, is characterized in being structured so as to comprise:

a main car that is provided with a workpiece holding portion that holds the workpiece and a riding portion that the main operator rides so as to be able to carry out operations on the workpiece that is held in the workpiece holding portion, and that is provided with a travel control apparatus that controls the travel state, and that automatically travels on a predetermined travel route that transits the plurality of stations; and a main operation platform apparatus that is a type of station that is provided so as to be able to move the main operation platform for carrying out the main operations, wherein when at least a portion of the main operations are carried out in the main car, it is possible to make the main car and the main operation platform move in synchrony.

As described above, the main operation platform apparatus can move the main operation platform in synchrony with the main car. Thus, even in the case of a main operation that is difficult to carry out only on the main car, the main operation can be carried out while moving by using the main operation platform that moves in synchrony with the main car. Thereby, it is possible to realize cell manufacturing more smoothly.

Furthermore, there may be a subsidiary car on which a subsidiary operator rides, the subsidiary operator carrying out subsidiary operations in which parts and/or jigs that are necessary for the main operations are prepared, and the main car and the subsidiary car can travel together so as to be able to transfer parts and/or jigs between the main car and the subsidiary car.

In this exemplary case, as described above, by introducing a subsidiary car, it is possible to divide the operation steps into main operations and subsidiary operations and proceed by carrying them out simultaneously, and it is possible to implement the cell manufacturing method more efficiently.

In addition, in the case in which a subsidiary car is introduced, furthermore, there may be a subsidiary operation platform apparatus that is a type of station provided so as to be able to move a subsidiary operation platform for carrying out subsidiary operations, and when at least a portion of the subsidiary operations are carried out in the subsidiary car, it is possible to make the subsidiary car and the subsidiary operation platform move in synchrony.

As described above, the subsidiary operation platform apparatus moves the subsidiary operation platform in synchrony with the subsidiary car. Thus, even in the case of a subsidiary operation that is difficult to carry out only on a subsidiary car, the subsidiary operation can be carried out while moving by using the subsidiary operation platform that moves in synchrony with the subsidiary car. Thus, even in the case in which a subsidiary car is introduced, it is possible to carry out the cell manufacturing more smoothly.

In addition, in the case in which a subsidiary car is introduced, the cell manufacturing facility may be provided with only a subsidiary operation platform apparatus, and not provided with a main operation platform apparatus.

Specifically, a cell manufacturing facility in which a main operator, who carries out a main operation that includes a plurality of steps in which parts are installed in a workpiece, is moved along with the workpiece so as to transit a plurality of stations in which auxiliary operations related to the main operations are carried out, is characterized in comprising:

a main car that is provided with a workpiece holding portion that holds the workpiece and a riding portion that the main operator can ride so as to be able to carry out operations on the workpiece that is held in the workpiece holding portion, and that is provided with a travel control apparatus that controls the travel state, and that automatically travels on a predetermined travel route that transits the plurality of stations;

a subsidiary car on which a subsidiary operator rides, the subsidiary operator carrying out subsidiary operations in which parts and/or jigs that are necessary of the main operations are prepared; and a subsidiary operation platform apparatus that is a type of station provided so as to be able to move a subsidiary operation platform for carrying out subsidiary operations, wherein when at least a portion of the subsidiary operations are carried out in a subsidiary car, the subsidiary car and the subsidiary operation platform are moved in synchrony, and the main car and the subsidiary car can travel together so as to be able to transfer parts and/or jigs between the main car and the subsidiary car.

The main operation platform apparatus may be structured such that the main operation platform stands by at an operation start position, the main operation platform moves in synchrony with the main car after the main car has reached the operation start position, and the main operation platform returns to the main operation start position when the main car and the main operation platform have reached the operation completion position, and stands by.

For example, in the case in which the main operation platform is structured such that it can be moved by an extremely weak force, the operator of the main car may operate and move the main operation platform. However, as described above, an exemplary function of the main operation platform itself is to move in synchrony with a main car and return to an original position under specified conditions. Thereby, it is possible to realize a more stable main operation, and stands by.

The main operation platform may be structured so as to be disposed to be able to move on an inclined path that inclines such that the height decreases as the operation start position is approached from the operation completion position, the main operation platform is linked to and moves in synchrony with the main car from the operation start position to the operation completion position, and the main operation platform returns to the operation start position by moving along the inclined path under its own weight by releasing the link with the main car at the operation completion position, and stands by.

In this exemplary case, the forward motion of the main operation platform can be carried out by the travel force of the main car or the subsidiary car, which are linked, whereas the return of the main operation platform can be realized by the main operation platform's own weight due to the presence of the inclined path. Specifically, it is possible to move the main operation platform without introducing a dedicated drive power. Thereby, it is possible to realize a reduction in the costs of introducing equipment and the running costs.

The main transfer means and/or the subsidiary transfer means may be structured so as to have a main operation platform that can move between a start point and an end point, and the main operation platform includes an energy storing means that stores energy accompanying the movement from the start point to the end point and a kinetic energy converting means that converts the energy that has been stored by the energy storing means to kinetic energy for moving the main operation platform from the start point to the end point. The main operation platform moves synchrony with the main car from the start point to the end point due to the linked state therebetween, and at the same time, energy is accumulated in the energy storing means. By releasing the linked state between the main car and the subsidiary car, the main operation platform moves due to the kinetic energy, which is the energy that has been stored in the energy storing means that has been converted to kinetic energy by the kinetic energy converting means, and returns to the start point to stand by.

In this exemplary case as well, the forward movement of the main operation platform can be carried out by the travel force of the main car and the subsidiary car, which are linked, whereas the reverse movement of the main operation platform is realized by the energy storing means and the kinetic energy converting means. Specifically, in this case as well, it is possible to move the main operation platform without introducing a dedicated drive power. Thus, it is possible to realize a reduction of the equipment introduction costs and the running costs.

The subsidiary operation platform apparatus can be structured such that the subsidiary operation platform stands by at an operation start position, the subsidiary operation platform moves in synchrony with the subsidiary car after the subsidiary car has reached the subsidiary operation start position, and the subsidiary operation platform returns to the operation start position when the subsidiary car and the subsidiary operation platform have reached the operation completion position, and stands by.

For example, in the case in which the subsidiary operation platform, like the main operation platform described above, is also structured such that is can be moved by an extremely weak force, the operator of the subsidiary car may operate and move the subsidiary operation platform. However, as described above, a function of the subsidiary operation platform itself is to move in synchrony with a subsidiary car and return to an original position under specified conditions and stand by. Thereby, it is possible to realize a more stable subsidiary operation.

In addition, the subsidiary operation platform can be structured so as to be disposed so as to be able to move on an inclined path that inclines such that the height decreases as the operation start position is approached from the operation completion position, the subsidiary operation platform is linked to and moves in synchrony with the subsidiary car from the operation start position to the operation completion position, and the subsidiary operation platform returns to the operation start position by moving along the inclined path under its own weight by releasing the link with the subsidiary car at the operation completion position, and stands by.

In this case, the forward motion of the subsidiary operation platform can be carried out by using the travel force of the subsidiary car that is linked thereto, whereas the return of the subsidiary operation platform can be realized under the weight of the subsidiary operation platform due to the presence of the inclined path. That is, it is possible to move the subsidiary operation platform without introducing a dedicated drive force. Thus, it is possible to realize a reduction in the facility introduction cost and the running costs.

In addition, the subsidiary operation platform may be structured so as to include energy storing means that stores energy accompanying the movement of the subsidiary operation platform from the operation start position to the operation completion position and kinetic energy converting means that converts the energy that has been stored by the energy storing means into kinetic energy that acts on the subsidiary operation platform from the operation start position to the operation completion position, the subsidiary operation platform is linked to and moves in synchrony with the subsidiary car from the operation start position to the operation completion position, energy is stored by the energy storing means, and the subsidiary operation platform returns to the operation start position due to the kinetic energy by the kinetic energy converting means, which is the energy stored in the energy storing means that has been converted into kinetic energy, by releasing the link with the subsidiary car at the operation completion position, and stands by.

In this exemplary case as well, the forward movement of the subsidiary operation platform can be carried out by using the travel force of the subsidiary car that is linked thereto, whereas the return of the subsidiary operation platform can be realized by the energy storing means and the kinetic energy converting means. That is, in this case as well, it is possible to move the subsidiary operation platform without introducing a dedicated drive force. Thus, it is possible to realize a reduction in the facility introduction cost and the running costs.

In addition, the main car is provided with a workpiece holding portion that holds the workpiece and a riding portion that an operator can ride so as to be able to carry out an operation while traveling.

In addition, the main car may be provided with a travel control apparatus that controls the travel route, which transits the plurality of stations, and the travel speed. An automated guided vehicle, usually referred to as an AGV, can be adopted as a main car that is provided with the travel control apparatus.

According to this mode, the main car can automatically travel along a prescribed travel route while the main operator is riding therein. Therefore, it is not necessary for the main operator to drive the main car, it is possible for the operator to concentrate on the operation even while traveling, and the efficiency of the operation is increased. Note that a driving operation portion may be provided for the main operator to drive while riding. Thereby, as necessary, the main operator can switch between automatic travel and manual travel, and can carry out intended travel.

A plurality of main cars may also be able to travel simultaneously along the travel route. For example, if a plurality of automated guided vehicles described above is used and control is carried out so as to maintain a space therebetween, a production amount can be expected that is equivalent to the production amount per automated guided vehicle multiplied by the number of vehicles.

In the case in which the subsidiary car is introduced, the subsidiary car is provided with a riding portion that enables the operator to ride so as to be able to carry out operations while traveling. According to this mode, even while the subsidiary car is traveling similarly to the main car, the subsidiary operator can concentrate on the operation, and the efficiency of the operation is increased.

The subsidiary car is provided with tracking means in order to travel together with the main car. The tracking means may be a linking rod that links the subsidiary car and the main car. In addition, the tracking means may include a wireless communication means that operates between the subsidiary car and the main car and a subsidiary travel control apparatus that controls the travel of the subsidiary car. The subsidiary car may travel together with the main car so as not to become separated therefrom, so that it is possible to directly or indirectly deliver parts and/or jigs to the main car.

A linking rod that physically connects the subsidiary car and the main car may be used as the tracking means for traveling together. Because the subsidiary car can also travel due to the drive force of the main car by using the linking rod, a power source for the subsidiary car becomes unnecessary. However, a condition of this mode is that no obstacles are present where the linking rod passes along the travel route.

In cases in which, for example, the part shelves of a station interfere with the passage of a linking rod, wireless communication means and a subsidiary car control apparatus may be provided. In the wireless communication means, information about the positions and speeds of the cars can be transmitted between the subsidiary car and the main car. In addition, in the subsidiary travel control apparatus, it is possible to carry out control of the travel of the subsidiary car in conformity to the position and speed of the main car. Note that in a method that uses wireless communication means, a power source is also necessary for the subsidiary car.

A same number of subsidiary cars as the plurality of main cars may travel together associated with the respective main cars. In order to increase the manufactured amount, the subsidiary cars that are associated with the plurality of main cars may be used in the same number as the main cars and travel together.

The main car may have a circular route on which it returns to the original position after circling one time, and the subsidiary car may have a subsidiary circular route that is on the outside of this circular route. At the point in time that the main car has transited all stations and the workpiece has been completed, the workpiece is exported from the main car. Subsequently, in order to manufacture the next workpiece, it is necessary for the main car to return to the original start position. Therefore, having a circular route in which the workpiece export position is associated with the start position is advantageous in terms of production efficiency. In the case in which this route is made a linear one-way return travel route, time is lost when the main car returns along the return route without any operation being carried out.

When the main car has a circular route, the subsidiary car travels together along the outside or the inside of the circular route of the main car. Here, the case in which the subsidiary operations handle a larger number of parts than the main operations is common. Therefore, an arrangement in which the main car is disposed on the inside and the subsidiary car is disposed on the outside, and furthermore, the parts are supplied from the outside is rational.

The travel route of the main car may be segmented into a plurality of segments, and separate subsidiary cars that travel together on the respective segmented travel routes may be provided. In the case in which the subsidiary car has a larger number of operations than the main car, separate subsidiary cars may be provided such that the subsidiary operations are carried out by a plurality of operators. Thereby, it is possible to distribute the subsidiary operations among the plurality of operators rationally, and the overall production efficiency is significantly improved.

For example, in the case in which there are twice as many subsidiary operations as there are main operations, the travel route may be segmented into a front half and a back half, and one main car may travel together with two subsidiary cars, where one subsidiary car is on the front half and the other subsidiary car is on the back half. According to this mode, the subsidiary car that travels together along the front half of the travel route can continue a subsidiary operation independently while the main car is traveling along the back half of the travel route. In addition, it is possible to finish the subsidiary operation exactly by the time that the main car has returned, and to deliver the parts and/or jigs. A subsidiary car that travels together along the back half of the travel route is similar.

The subsidiary car may have a subsidiary travel route along which it travels together with the main car and a subsidiary return route along which it returns to the original position after separating from the main car. In addition, the subsidiary car may have a subsidiary travel route along which it travels together with the main car and may return to the original position by traveling backward along the subsidiary travel route after separating from the main car.

In the case in which the travel route of the main car described above is segmented and the main car travels together with separate subsidiary cars, after the subsidiary car has traveled together along the subsidiary travel route, the subsidiary car separates from the main car and returns to the original position by traveling on its own route. At this time, a subsidiary return route may be provided that is separate from the subsidiary travel route and the subsidiary car may travel backward along the subsidiary travel route. Whether either of the routes is used may be determined by taking into account the disposition of the content of the subsidiary operations and the parts and/or jigs, restrictions on the operation area, and the like.

BRIEF DESCRIPTION OF THE DRAWINGS

Aspects of the present invention will become more apparent by describing in detail non-limiting embodiments thereof with reference to the attached drawings, in which:

FIG. 4 is a figure of a transmission production step list that shows the operation steps according to an exemplary embodiment.

DETAILED DESCRIPTION OF EXEMPLARY EMBODIMENTS OF THE INVENTION

The following description of illustrative, non-limiting embodiments of the invention discloses specific configurations and components. However, the embodiments are merely examples of the present invention and, thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, processes and operations of the embodiments that are known to one skilled in the art are omitted for the sake of clarity and brevity.

Exemplary embodiments of the invention will be explained in detail with reference to FIG. 1 to FIG. 15. The perspective view of FIG. 1 is an explanatory drawing that shows a facility that is an embodiment of a cell manufacturing facility of an exemplary embodiment of the present invention and in which an automatic transmission is manufactured, and the overall structure will be explained with reference to these drawings.

Figure 1:
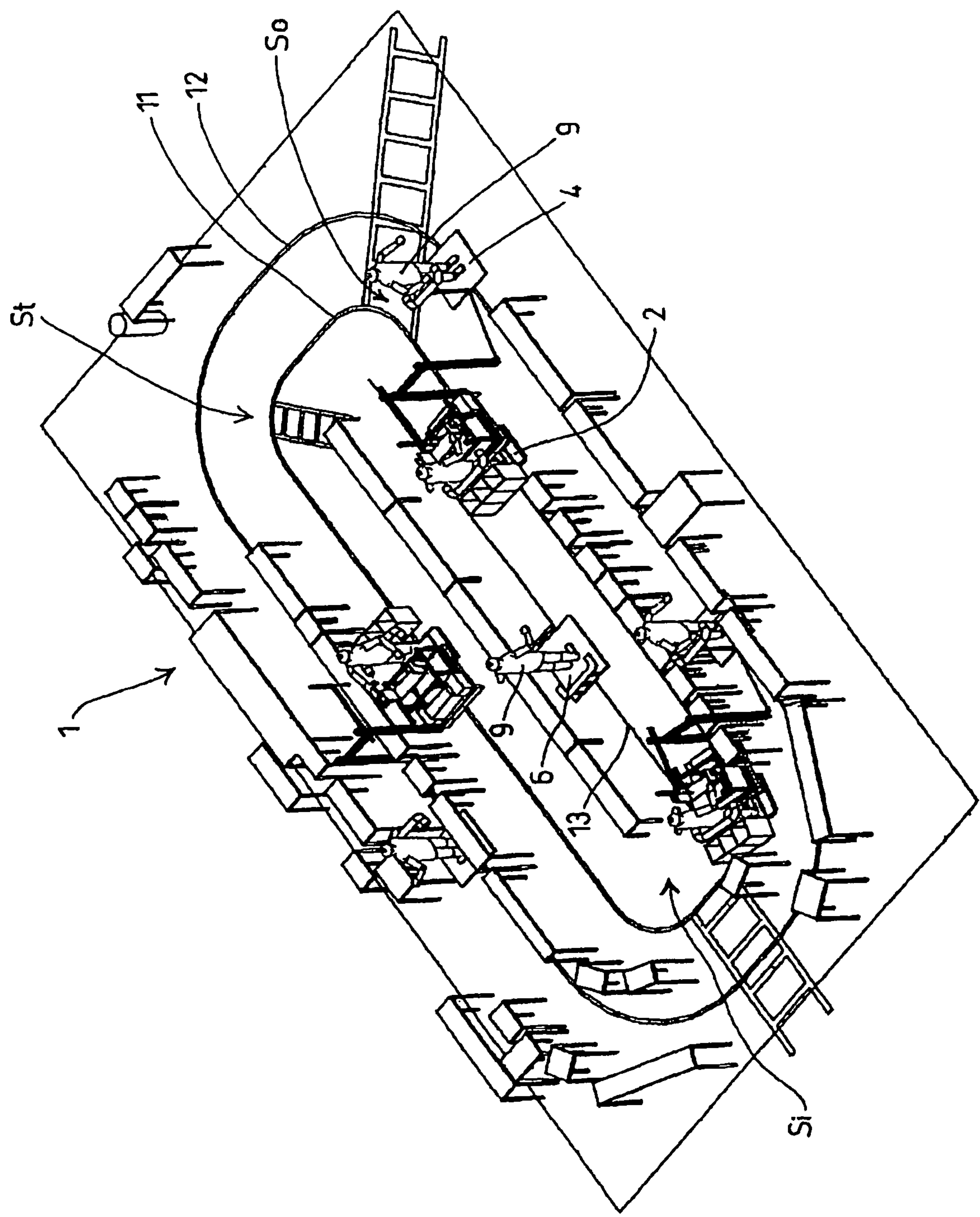
FIG. 1 is a perspective view for explaining a transmission production facility, which is an exemplary embodiment of the cell manufacturing facility of the present invention.

In the transmission production facility in FIG. 1, three groups, each group consisting of a main car 2 and a subsidiary car 4, travel together. Each of the main cars 2 automatically travels along an inner circular route 11. The subsidiary cars 4 are linked to and pushed by the main cars 2, and travel on an outside circular route 12. In addition, a linear route 13 is provided from the lower left to the upper right in FIG. 1, and the preprocessing car 6 travels reciprocally thereon. The operators 9 ride each of the cars 2, 4, and 6, and are able to carry out operations while traveling. In addition, stations are provided along each of the routes 11, 12, 13, and structured such that the necessary parts and/or jigs are prepared.

What is here referred to as a "station", as has been described above, is a facility having the function in which auxiliary steps related to the main operations are carried out. For example, not only do the import station Si, the switching station St, and the export station So described below correspond to stations, but, for example, there are also stations at which auxiliary steps are carried out. For example, there are stations where parts to be attached to the workpiece are supplied, stations at which the tools (jigs) used in an operation are supplied, and stations at which predetermined processes are carried out after receiving a workpiece from the operation cars. More specifically, there are stations in the facility at which the operation steps of the main operations represented by the reference symbols ML1 to ML13 (FIG. 3) described below are carried out, and stations at which the operation steps of the subsidiary operations represented by the reference symbols SL1 to SL10 (FIG. 3) described below are carried out. Furthermore, the transfer apparatus described below is also a type of station.

It will be appreciated that a subsidiary car or the like can be provided to travel among mobile or stationary stations or only on a predetermined segment but does not travel with the main car 3, instead of using the subsidiary car 4 that travels with the main car 2. However, an example that includes the subsidiary car 4 is described herein.

The case 7 of a transmission may serve as a workpiece of the transmission production facility 1. The case 7 is mounted on a preprocessing car 6 at the import station Si on the lower left of FIG. 1, and it is conveyed to the switching station St in the upper right of the figure. At the switching station St, the case 7 is switched from the preprocessing car 6 to the main car 2. While the main car 2 travels around the circular route 11 to the left, parts are installed in the case 7 to complete the transmission, and the main car 2 arrives at the export station So. At the export station So, after the completed transmission has been exported, the main car 2 returns to the switching station St, and the next case is mounted thereon.

A subsidiary car 4 is pushed by a main car 2 and travels along the outer circular route 12. The subsidiary car 4 is positioned, for example, to the right in front of a main car 2, and they travel together. In addition, parts and materials are taken from outside of the circular route 12, and after the preparatory operations such as pre-assembly have been carried out, the parts and jigs are mounted on a mounting platform that is inside of the circular route 12. Thereby, the transfer to the following main car 2 can be carried out.

Figure 2:
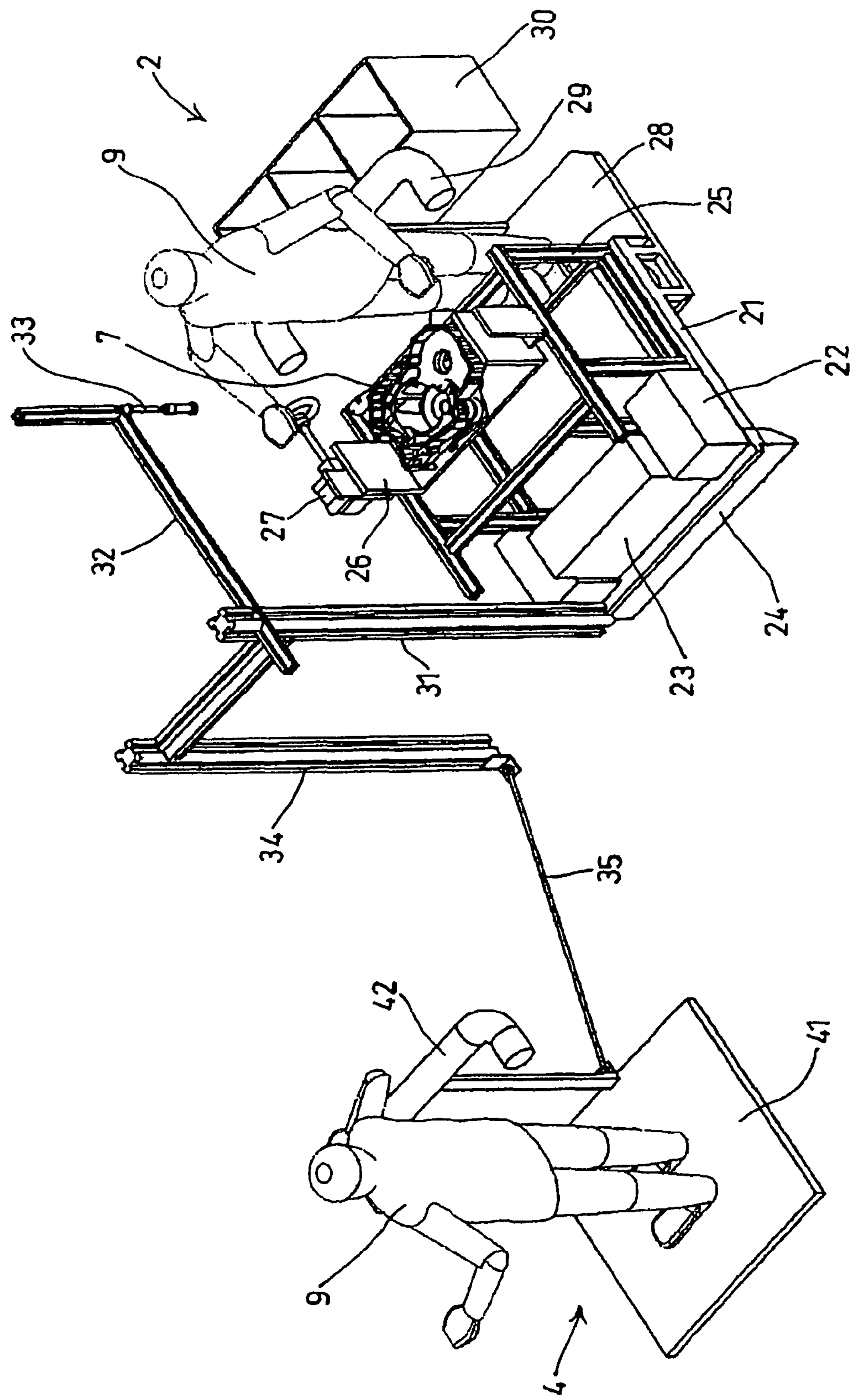
FIG. 2 is an enlarged perspective view for explaining the main car and the subsidiary car according to an exemplary embodiment.

Next, the structure of the main car 2 and the subsidiary car 4 will be explained with reference to the explanatory drawing in FIG. 2. Travel wheels and a route detecting sensor (not illustrated) are provided on the main car 2 at the lower side of the car body portion 21, and a battery 22 and a travel control apparatus 23 are provided on the upper side thereof. Furthermore, a bumper 24 and a proximity sensor are provided on the lower front portion of the car body portion 21.

The circular route 11 of the main car 2 is set by attaching a magnetic tape to the floor. The route detecting sensor detects the magnetic tape and a detection signal is transmitted to the travel control apparatus 23. Based on this detection signal, the travel control apparatus 23 controls the direction and speed of the travel wheels, and it is thereby possible to travel along the circular route 11. The proximity sensor detects obstacles and other main cars that are in front, and the detection signal is transmitted to the travel control apparatus 23. The travel control apparatus 23 is structured such that deceleration or stopping is carried out as necessary in order to avoid collisions, and safety is ensured.

A frame body portion 25, which is structured by assembling mold steel, is erected on top of the car body portion 21 of the main car 2, and the workpiece holding portion 26 and the workpiece adjusting portion 27 are erected on the frame body portion 25. The workpiece holding portion 26 holds the case 7 of a transmission, which is the workpiece. The case 7 is attached and released by the workpiece adjusting portion 27, and the adjustment of the height and position can also be carried out. Thereby, the operator 9 can fasten the case 7 at an appropriate height and position to carry out the operation. In addition, manual driving is also enabled by providing a driving portion on the back surface of the frame body 25.

A riding portion 28, on which an operator 9 can ride, extends out from the lower bottom portion of the car body portion 21 of the main car 2. In addition, a handrail 29 that is supported in an upward direction on the back portion of the riding portion 28 is provided, and thereby ensures the safety of the operator 9 who is riding and provides a convenient and stable operation position. Furthermore, a box-shaped accommodating portion 30 is provided behind the handrail 29, and tools and parts can be accommodated therein.

A support member 31 is provided in a perpendicular direction on the right front of the car body portion 21 of the main car 2, and an arm 32 is provided that overhangs in the horizontal direction from the upper end of the support member 31. A lifting jig 33 is provided on the distal end of the arm 32. The arm 32 can rotate in the horizontal direction, and an operation in which the parts and the jigs are lifted from the station and attached to the case 7 can be carried out easily.

A linking member 34 is erected facing the side from midway along the supporting member 31, and the linking member 34 turns downward at a position thereon. A linking rod 35 is disposed facing forward from the lower end of the linking member 34, and the distal end of the linking rod is linked to the car body portion 41 of the subsidiary car 4. The linking member 34 and the linking rod 35 correspond to the linking rod that physically links the subsidiary car 4 and the main car 2. A downward facing bracket-shaped gate is formed by the supporting member 31 and the connecting member 34. This gate is for preventing interference with stations that are disposed between the circular routes 11 and 12.

On the subsidiary car 4, route guidance wheels and travel wheels (not illustrated) are provided on the bottom side of the car body portion 41. The circular route 12 of the subsidiary car 4 is defined by providing guide grooves in the floor surface. The route guidance wheels are structured so as to fit into and be guided by the guide rail that is mounted on the floor along the circular route 12. In contrast, wheels whose forward direction freely changes are used for the travel wheels, and they can travel along the circular route 12. The method of defining the circular route 12 may also provide a guide groove or a guide wall rather than a guide rail, and the subsidiary car travels therealong.

According to the structure described above, when the main car 2 travels, the driving force is transferred to the subsidiary car 4 via the support member 31, the linking member 34, and the linking rod 35. Therefore, the subsidiary car 4 can travel together with the main car 2 in front thereof.

In addition, in the subsidiary car 4, the upper surface of the car body portion 41 doubles as a boarding portion. A handrail 42 is provided that is supported in an upward direction on the back portion of the car body portion 41, and ensures the safety of the operator 9 who is riding and provides a convenient and stable operation position.

Figure 3:
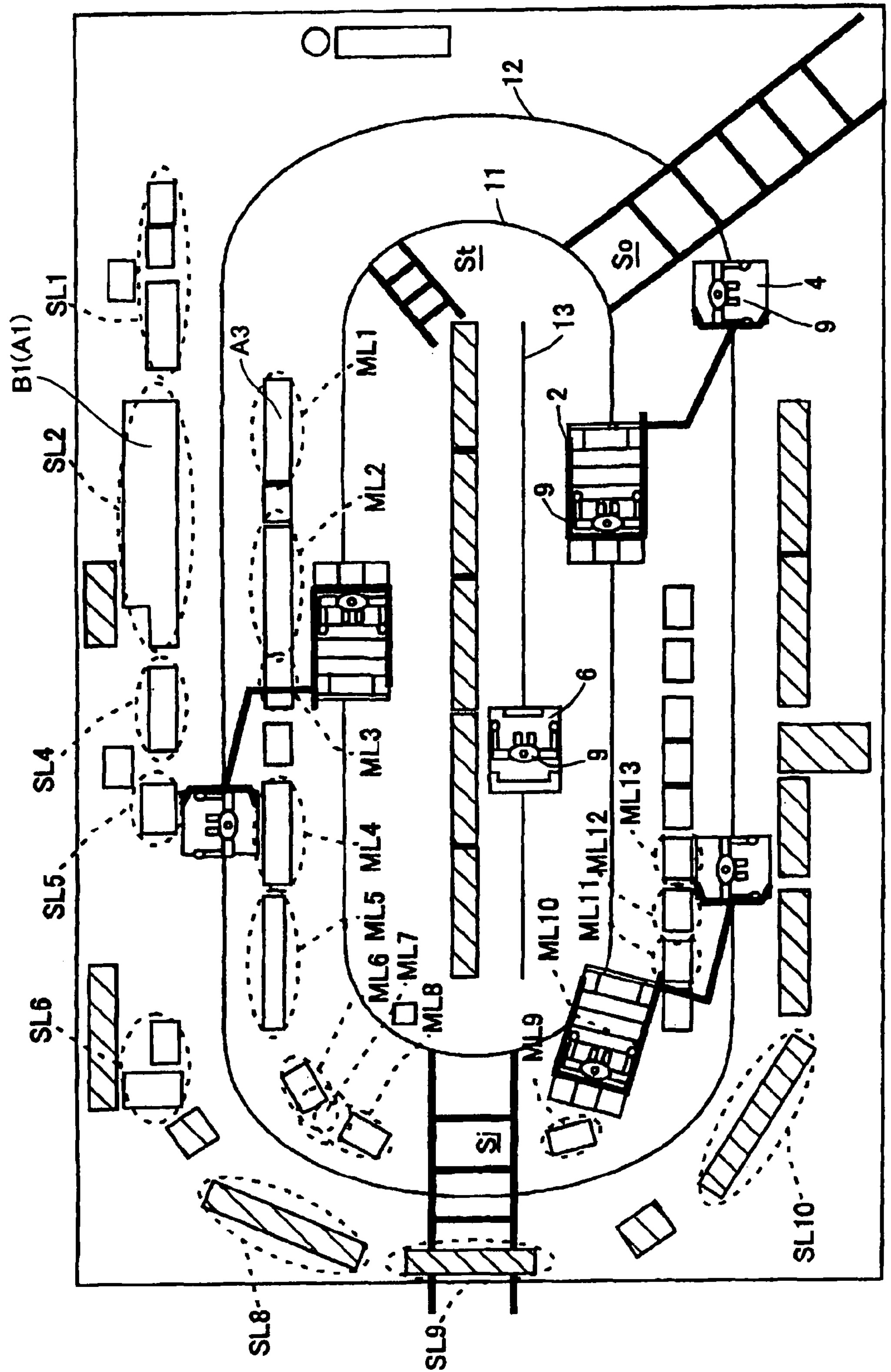
FIG. 3 is a planar drawing that shows the configuration of the cell manufacturing facility according to an exemplary embodiment.

Next, an exemplary method by which the transmission is manufactured by using the transmission production facility 1 described above will be explained. The planar drawing in FIG. 3 is a configuration diagram showing the configuration of the transmission manufacturing facility 1 that is shown in FIG. 1. In FIG. 3, the square shapes with diagonal lines indicate accommodation spaces for parts and members, and the unmarked squares indicate operation platforms and mounting platforms for transferring the parts and jigs. The reference symbols ML1 to ML13 show the operation steps in the main operations, and in FIG. 3, the approximate positions at which the parts and jigs are received are shown. By receiving parts at these positions, it is possible to carry out the installation operation in the case 7 that is held on the main car 2. The reference symbols SL1 to SL10 show the operation steps of the subsidiary operations, and in FIG. 3, the positions of the operation platforms corresponding to the operation steps SL1 and SL10 are shown. On these operation platforms, subsidiary operations are carried out in which the parts and jigs that are necessary for the main operations are prepared. It is noted that the part accommodation spaces, the operation platforms, and the mounting platforms described above correspond to stations.

FIG. 4 is an operation step overview list showing, in sequence, operation steps for transmission manufacture. FIG. 4 also shows relationships between the main operations and the subsidiary operations. Specifically, FIG. 4 shows that the parts and jigs that have been prepared by subsidiary operations are used in the main operations and are denoted by identical numerals. For example, FIG. 4 shows that the part referred to as the B2 assembly, which is assembled in subsidiary operation SL1, is used in the main operation ML1. An empty column means that a subsidiary operation is unnecessary, for example. It will be appreciated that the word "assembly" means the intermediate parts that are pre-assembled into the component parts and the combined parts.

Although omitted in the operation steps overview list in FIG. 4, the case 7 for the transmission, which is the workpiece, is imported from outside the operation area and is mounted on the preprocessing car 6 at the import station Si. The preprocessing car 6 conveys the case 7 to the switching station St via the travel route 13, and the preprocessing is carried out while traveling. At the switching station St, the case 7 is switched from the preprocessing car 6 to the main car 2. Then the main car 2 and the subsidiary car 4 begin to travel, and the overall operation steps begin. Below, the operation steps will be explained in sequence.

Figure 5:
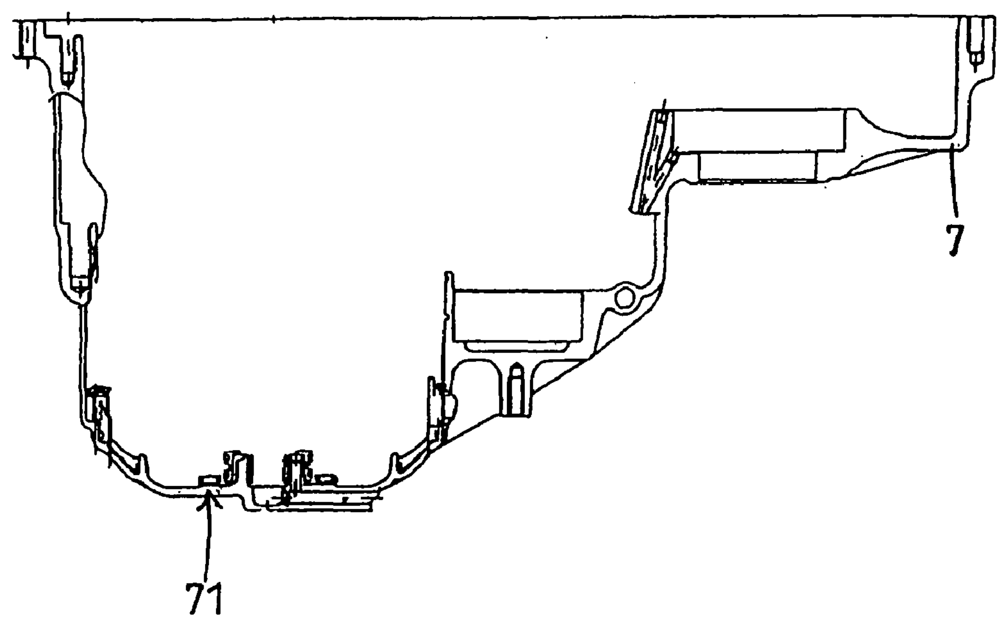
FIG. 5 is a drawing that shows the B2 assembly installation state during the transmission production according to an exemplary embodiment.

First, in the subsidiary operation SL1, the operator 9, who carries out the subsidiary operation, assembles the B2 assembly 71. The B2 assembly 71 involves a combined part for a brake portion. An O-ring, a return spring, and a snap ring are installed in the B2 piston, and this is held as a whole by an installation jig and is mounted on a mounting platform. Then, in main operation ML1, the operator 9, who carries out the main operation, takes the B2 assembly 71 on the mounting platform and installs it in the case 7. Thus, the cross-section of the case 7, which is the workpiece, is then in the B2 assembly installation state that is shown in FIG. 5.

The subsidiary operation SL1 described above is carried out on the traveling subsidiary car 4, and the main operation ML1 is carried out on the traveling main car 2. Therefore, when the operation has finished, in order to reach the position of the next step, additional time is not needed to move between steps. In addition, the transfer of the B2 assembly 71 is carried out on the mounting platform that is disposed between the two operation cars 2 and 4, and the operators 9 do not need to wait while moving. Note that after the installation operation has been completed, the installation jig remains on the mounting platform, and is used in the next assembly. At this time, because the position of the main car 2 moves between the installation start time and completion time, the mounting platform is a movable type mounting platform, and automatically returns the installation jig to the position at which it was at the start of the installation.

The distribution of the operation steps and the transfer procedures for the parts and jigs described above is similar in the following operation steps. Note that in the case in which a long period of time is required for particular operation steps, the operation cars 2 and 4 may be temporarily stopped.

Figure 6:
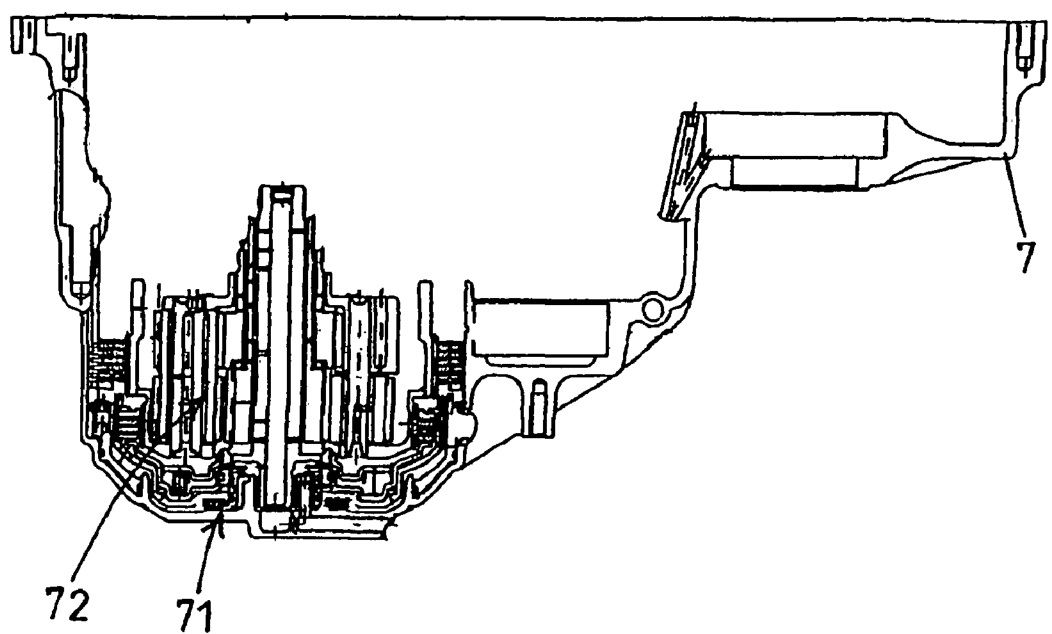
FIG. 6 is a drawing that shows the rear sub-installation state according to an exemplary embodiment.
Figure 7:
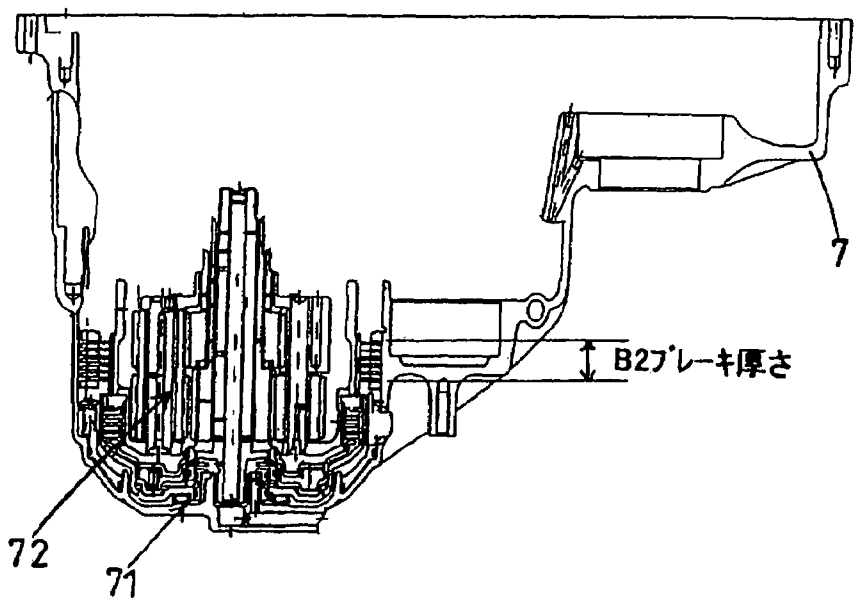
FIG. 7 is an explanatory drawing that shows the method in which the thickness of the B2 brake is measured according to an exemplary embodiment.

In the subsidiary operation SL2, the rear sub-assembly 72, which structures a portion of the shifting gear, a clutch portion, and the brake portion, is assembled. In the rear sub-assembly 72, bearings, spacers, a planetary gear assembly, and a brake plate are installed around the shaft of the clutch portion, and these are held by an installation jig. In the main operation ML2, the rear sub-assembly 72 is installed in the case 7, and the workpiece is then in the rear sub-installation state that is shown in FIG. 6.

The next main operation ML3 is an operation step in which dimensions are confirmed and parts are selected, and does not require any subsidiary operations. Specifically, the operator 9, who carries out the main operation, uses a plate thickness measuring jig, and measures the thickness of the B2 brake shown in FIG. 7. At this time, in order to suppress warping of the friction members of the multi-plate brake, the overall thickness of the brake is measured while compressing the jig. Next, based on the results of the measurement, a packing plate 73 having the appropriate thickness is selected so as to offset the individual differences in the thickness of the brakes. Thereby, the individual differences present during the brake manufacture can be compensated, and it is possible to make the pull the brakes uniform.

Figure 8:
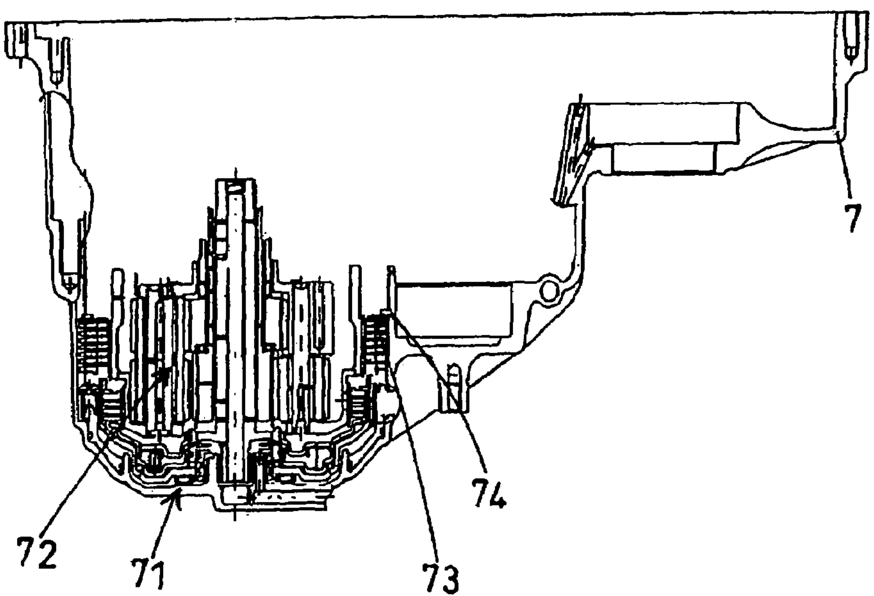
FIG. 8 is a drawing that shows the packing plate installation state according to an exemplary embodiment.

In the next subsidiary operation SL4, the snap ring 74 is prepared. The snap ring 74 that is used here is a type that fits into a groove in the inner surface of a cylinder, and it is necessary to make the outer diameter of the snap ring 74 smaller than the cylinder diameter by using a snap ring positioning jig. Furthermore, because this structure is not rotationally symmetric, in the jig, the alignment (the angle in the circumferential direction in the cylinder) during installation is also adjusted. In the main operation ML4, the packing plate 73 that was selected in the previous step is incorporated, and the snap ring 74 that was received from subsidiary operation SL4 is inserted. As a result, the workpiece is then in the packing plate installation state that is shown in FIG. 8.

Figure 9:
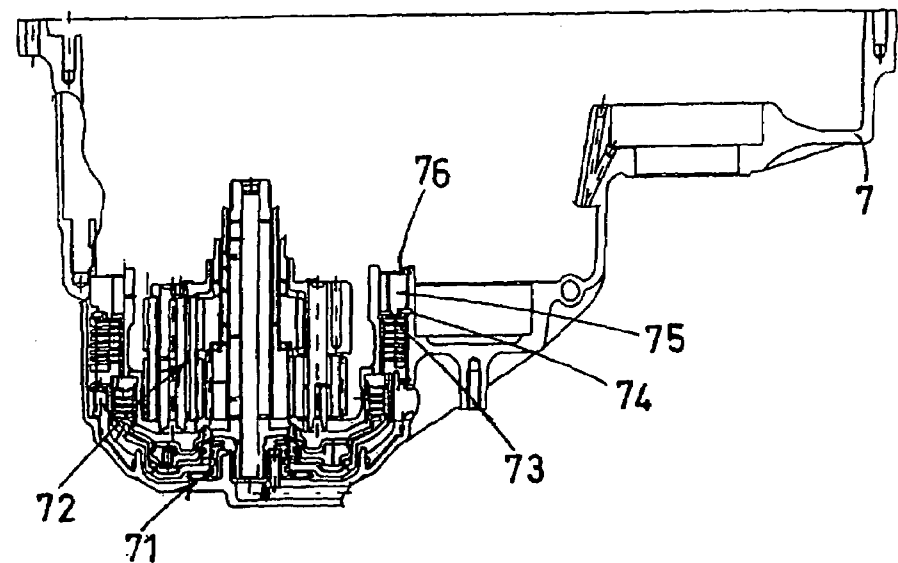
FIG. 9 is a drawing that shows the one-way-clutch installation state according to an exemplary embodiment.
Figure 10:
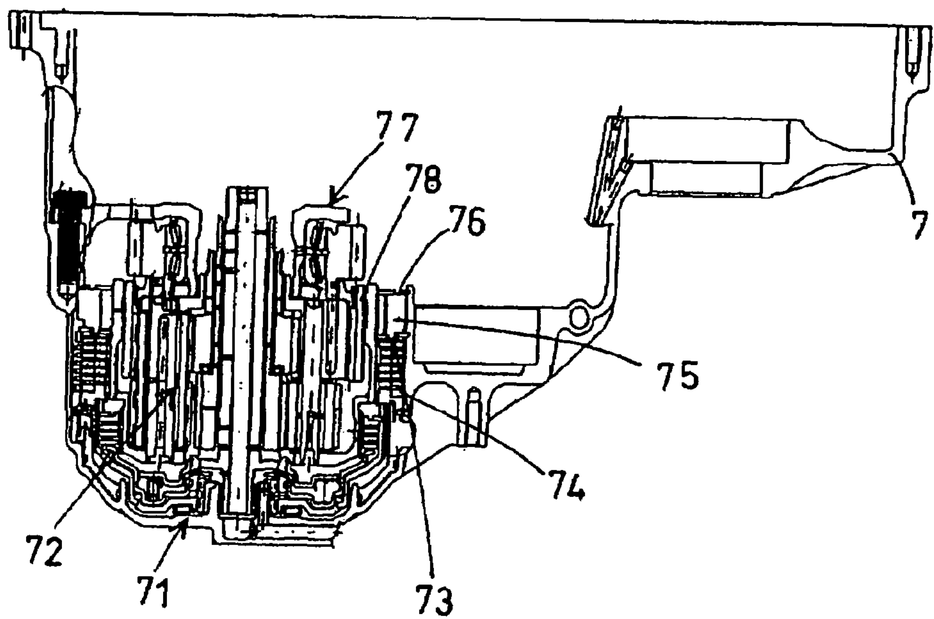
FIG. 10 is a drawing that shows the counter gear installation state according to an exemplary embodiment.

In subsidiary operation SL5, the one-way-clutch 75 and the snap ring 76 are set in the snap ring diameter reduction jig. Similarly to the previous step, the reduction of the diameter and alignment adjustment of the snap ring 76 are carried out. In the main operation ML5, the one-way-clutch 75 and the snap ring 76 are installed. At this time, because a jig is used, it is possible to install both parts at one time, and the operation efficiency is high. As a result, the workpiece is then in the one-way-clutch installation state that is shown in FIG. 9.

In subsidiary operation SL6, the counter gear assembly 77 is assembled. In the main operation ML6, first, the center support 78 is inserted. Next, the counter gear assembly 77 is incorporated, and the bolt 79 is tightened and fastened. The tightening of the bolt 79 is carried out by using an electric screw driver on the stationary station side. As a result, the workpiece is then in the counter gear installation state shown in FIG. 10.

Figure 11:
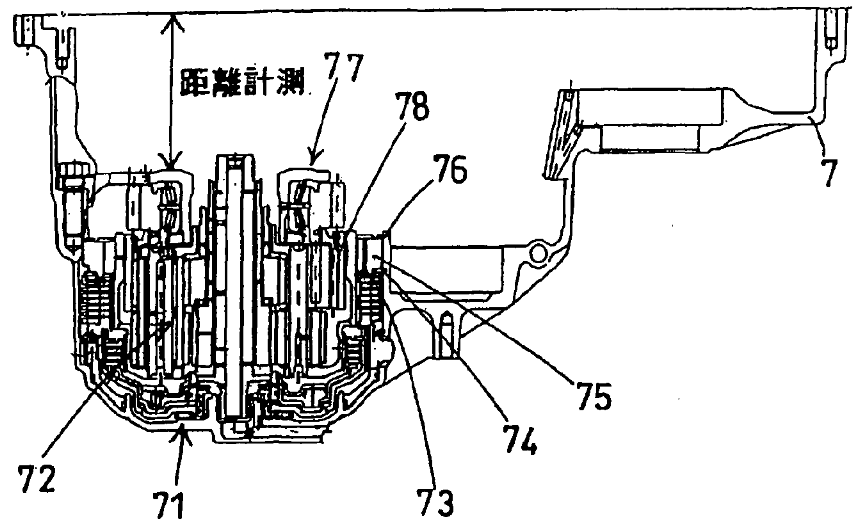
FIG. 11 is an explanatory drawing that shows the method in which the inclination of the counter gear is measured according to an exemplary embodiment.

The next main operation ML7 is an operation step in which the dimensions are confirmed, and this does not require a subsidiary operation. Specifically, as shown in FIG. 11, the distance between the upper end of the counter gear assembly 77 and the upper end of the case 7 is measured. At this time, the measurement is carried out while rotating the counter gear one time, and it is confirmed whether the counter gear assembly 77 is installed at an angle. In order to carry this out with a high efficiency, a measuring apparatus is used that has an automatic measuring function that intermittently measures at short intervals and a processing function that finds, for example, the average value of the measured data.

Figure 12:
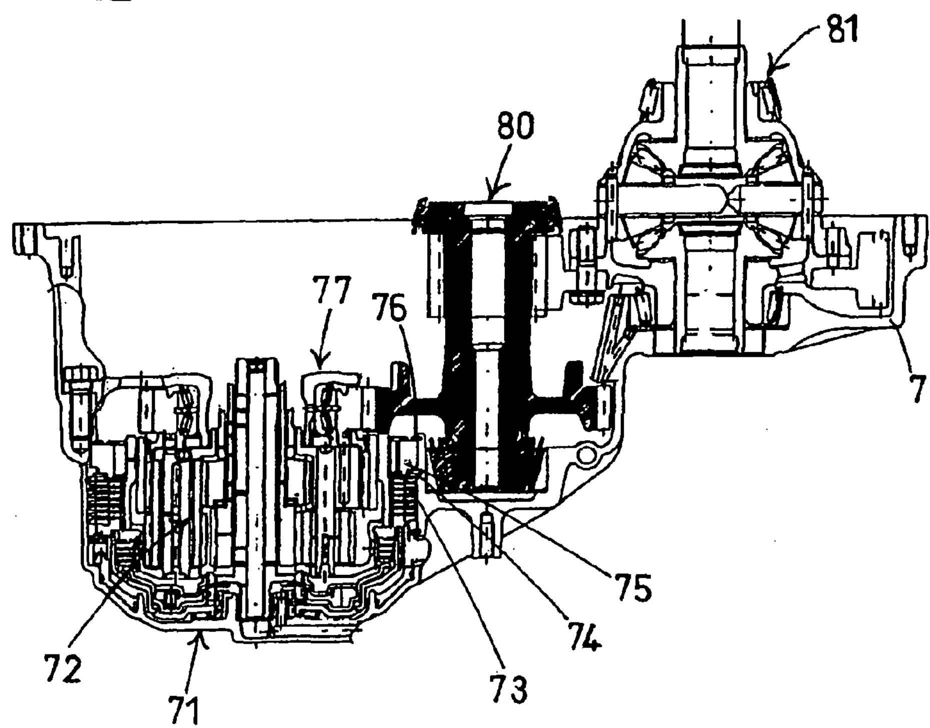
FIG. 12 is a drawing that shows the differential installation state according to an exemplary embodiment.
Figure 13:
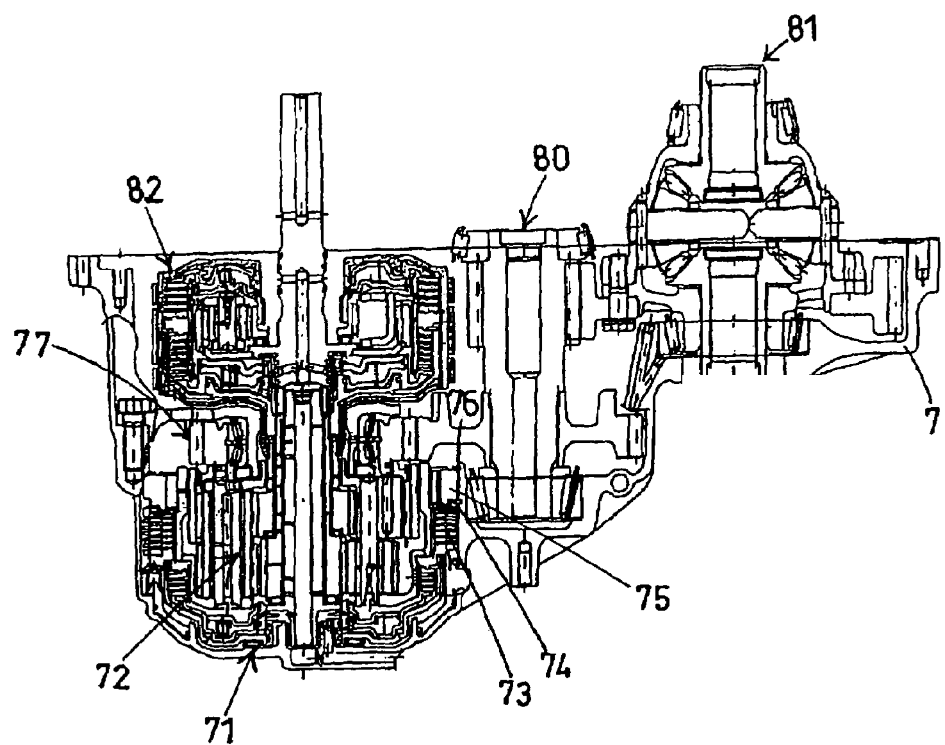
FIG. 13 is a drawing that shows the front sub-installation state according to an exemplary embodiment.

In the next subsidiary operation SL8, the drive pinion assembly 80 and the diff assembly (differential apparatus assembly) 81 are assembled. In the main operation ML8, the two assemblies 80 and 81 are installed, and the workpiece is then in the differential installation state that is shown in FIG. 12.

In subsidiary operation SL9, the front sub-assembly 82 and the C3 assembly (clutch portion) are assembled. In the main operation ML9, the front pre-assembly 80 and the C3 assembly are installed in the case 7, and then the drive sun gear and the B1 band brake are installed. As a result, the workpiece is in the front pre-assembled state shown in FIG. 13.

Figure 14:
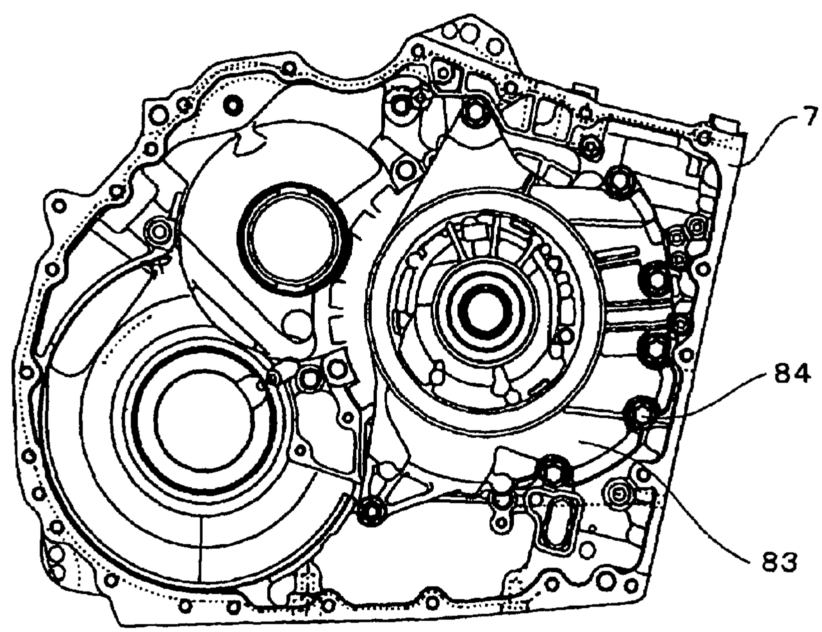
FIG. 14 is an explanatory drawing that shows the method in which the oil pump is installed according to an exemplary embodiment.
Figure 15:
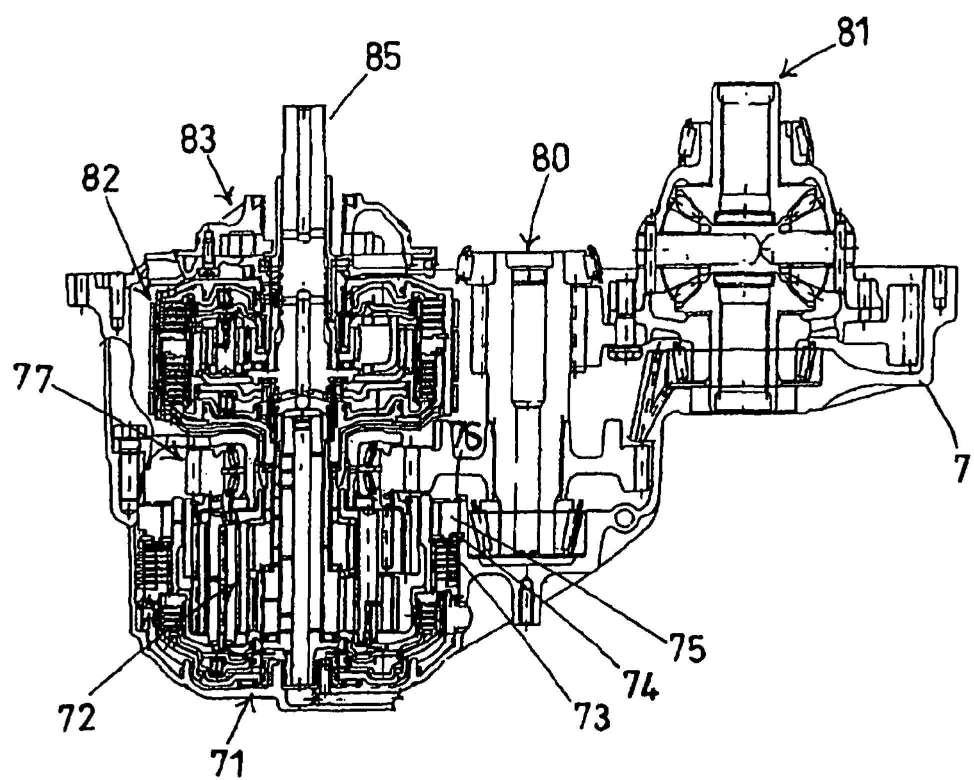
FIG. 15 is a drawing that shows the oil pump installation state according to an exemplary embodiment.

Next, in the subsidiary operation SL10, the oil pump assembly 83 is assembled. In the main operation ML10, 7 bolts shown in FIG. 14 are simultaneously partially tightened by using a bolt partial-tightening jig. Finally, the tightening is manually increased, but the operational efficiency can be greatly improved by using a temporary bolt tightening jig. As a result, the workpiece is in the oil pump installation state shown in FIG. 15.

In the main operation ML11, the shaft 85 is raised upward, the dimension of possible movement is measured, and it is confirmed that there is no deficiency in the parts around the shaft.

In the main operation ML12, using a band brake stroke measuring jig, the stroke of the B1 band brake is measured. With this jig, the displacement is found by pressing the engagement convexity of the B1 band brake, and the particular stroke of each brake is found.

In main operation ML13, the B1 piston assembly is installed, and the transmission is complete.

All of the operation steps are completed and the main car 2 and the subsidiary car 4 reach the export station So. Here, the completed transmission is exported by a separate conveying device, and it is delivered to the inspection step. Subsequently, the main car 2 and the subsidiary car 4 continue traveling along the circular routes 11 and 12, and return to the switching station St. Then the new case is mounted and the next manufacturing cycle starts.

In the transmission production facility 1 of the exemplary embodiments, the main car 2 and the subsidiary car 4 travel together, and the operation steps are divided and carried out. Thereby, it is possible to make a rational manufacturing method in which two operators 9 cooperate to manufacture one product. In addition, the amount of stored parts can be minimized, and it is possible to respond to the production of a single item or to perform mixed production in which a plurality of models is fabricated. Furthermore, even if the production model changes, there is the effect that it is possible to reconfigure the production line in a short period of time.

In addition, other than the travel of the cars and electric screw drivers, in this production facility, the use of additional power sources such as electrical power and compressed air is reduced whenever possible. Thus, far fewer actuators may be used than in a conventional facility and a reduction in energy consumption becomes possible. Furthermore, it will be appreciated that the space required for the operations is reduced.

Next, in the case in which the main car 2 continually transits a circular route 11 in the present exemplary embodiment, a portion of the main operation may also be carried out by using the main operation platform apparatus in addition to the main car 2. In addition, similarly, in the case in which the subsidiary car 4 continually transits a circular route 12, a portion of the subsidiary operations is carried out by using the subsidiary operation platform apparatus, but it may be carried out only on the subsidiary car 4. Various modes may be used for the main operation platform apparatus and the subsidiary operation platform apparatus. Exemplary embodiments thereof will now further be explained.

Figure 16:
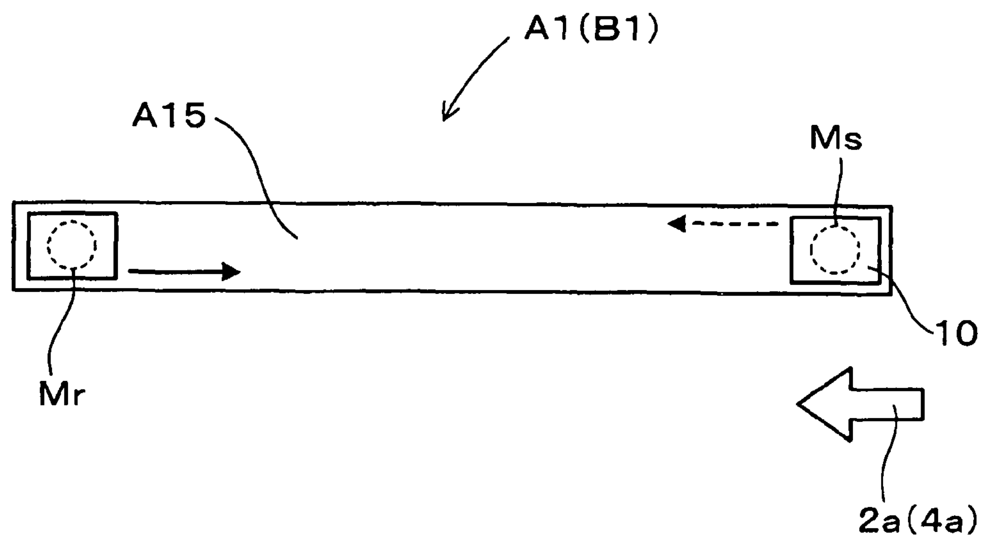
FIG. 16 is a planar view that shows the delivery apparatus according to an exemplary embodiment.

In an exemplary embodiment, a main operation platform apparatus A1 shown in this example can be used when carrying out an operation similar to the case in which the subsidiary operation SL2 in FIG. 3 described above is carried out. As shown in FIG. 16, this main operation platform apparatus A1 is structured such that the main operation platform A10 stands by at the operation start position Ms, the main operation platform A10 moves in synchrony with the main car 2 after the main car 2 has reached the operation start position A10, and the main operation platform A10 returns to the operation start position Ms when the main car 2 and the main operation platform A10 have reached the operation completion position Mr, and stands by.

Figure 17:
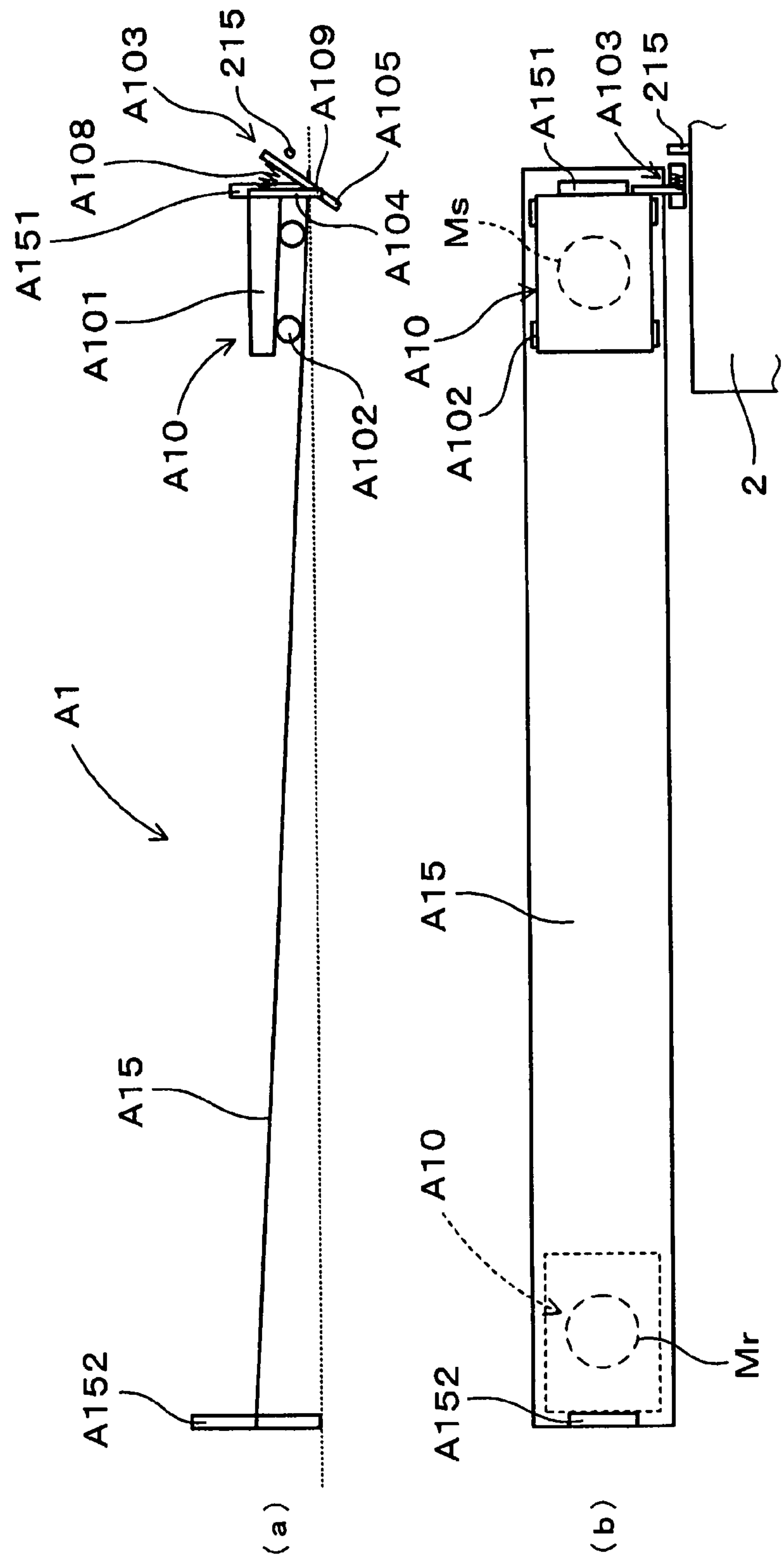
FIG. 17 is (a) a side view that shows the state in which the main operation platform is moving forward, and (b) a planar view that shows the state in which the main operation platform is moving forward according to an exemplary embodiment.
Figure 18:
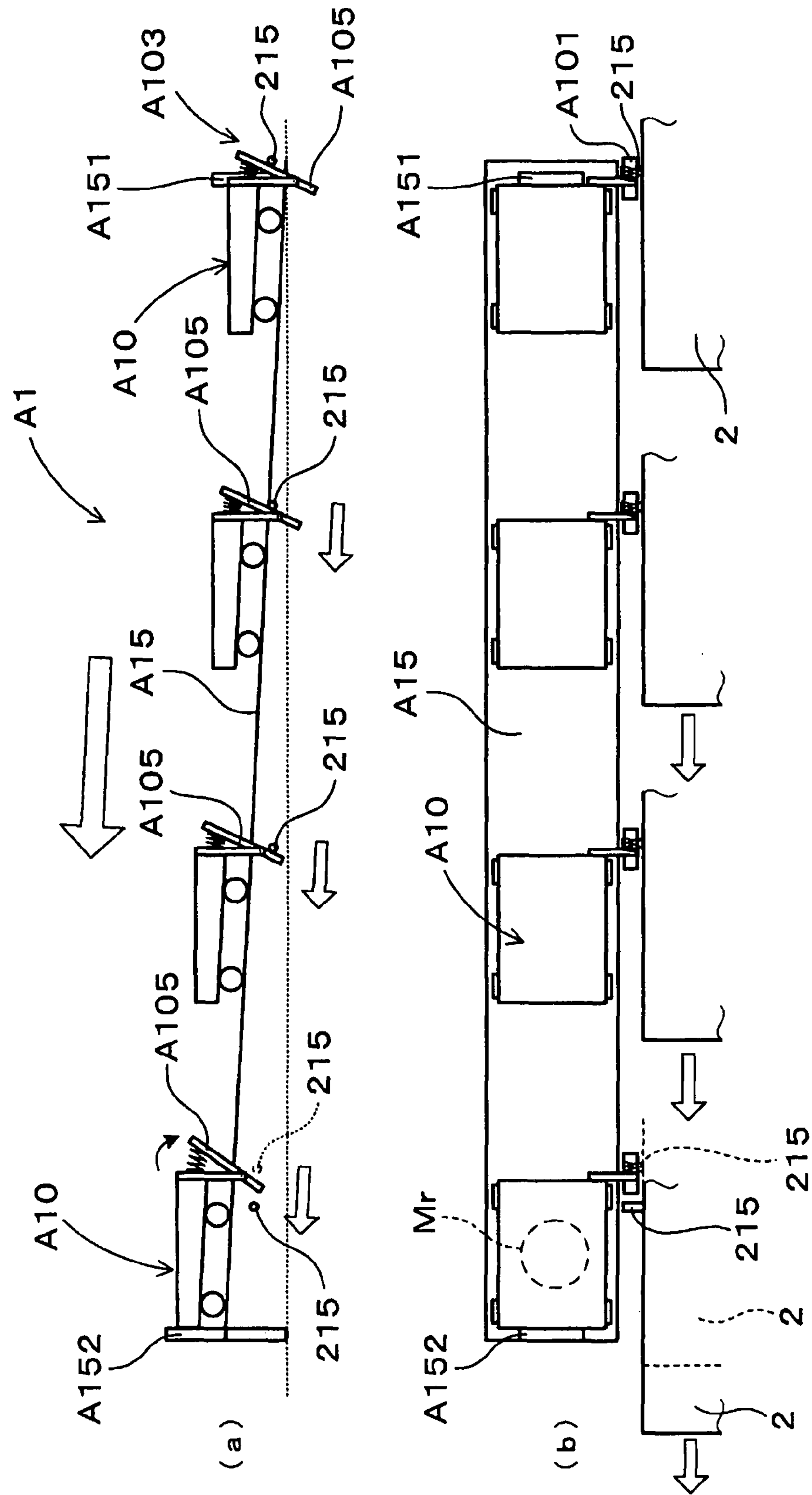
FIG. 18 is a (a) a side view that shows the state in which the main operation platform is moving backward, and (b) a planar view that shows the state in which the main operation platform is moving backward according to an exemplary embodiment.

More specifically, as shown in FIG. 17 and FIG. 18, the main operation platform A10 is disposed so as to be able to move on an inclined path A15 that inclines such that the height decreases as the operation start position Ms is approached from the operation completion position Mr. In addition, the main operation platform A10 is linked to and moves in synchrony with the main car 2 from the operation start position Ms to the operation completion position Mr, the main operation platform A10 returns to the operation start position Ms by moving along the inclined path A15 under its own weight by releasing the link with the main car 2 at the operation completion position Mr, and stands by.

Figure 19:
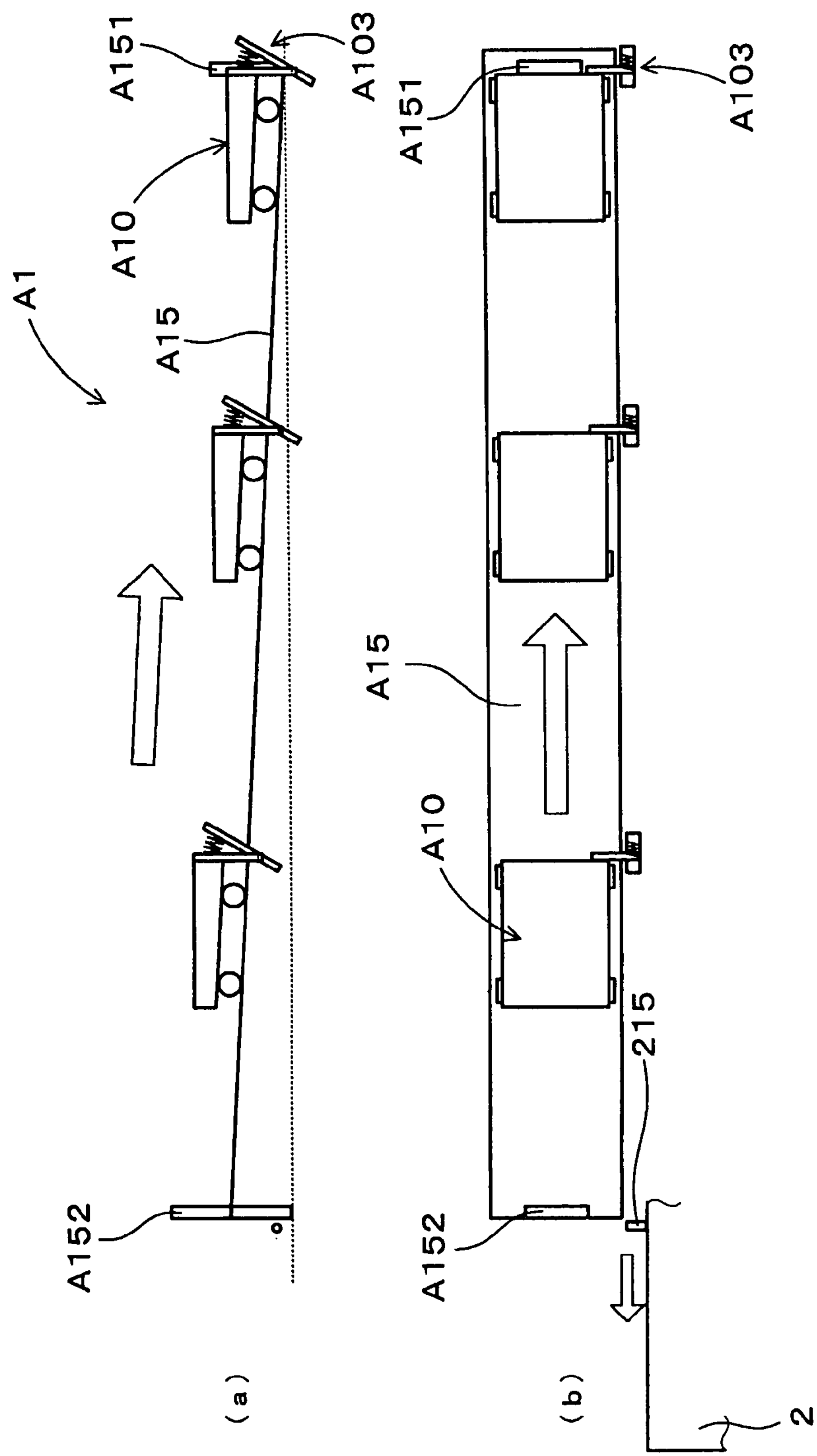
FIG. 19 is (a) a side view that shows the state in which the main operation platform is moving backward, and (b) a planar view that shows the state in which the main operation platform is moving backward according to an exemplary embodiment.

More specifically, as shown in FIG. 17 to FIG. 19, the stoppers A151 and A152 are disposed on both ends of the inclined path A15, and the main operation platform A10 is disposed so as to be able to travel between these stoppers. Due to the influence of the inclination of the inclined path A15, normally the back end of the main operation platform A10 abuts the stopper A151, that is, it stands by at the lowest point.

The main operation platform A10 includes four wheels A102 that can freely rotate and a platform body A101 that is disposed above the same. A linking member A103 for linking with the main car 2 is disposed on the main operation platform body A01.

The linking member A103 is structured by a base plate A104 that is disposed in a perpendicular direction, an abutting plate A105 that is disposed so as to be able to rotate with respect to the base plate A104 centered on the hinge A109, and a spring A108 that is disposed between base plate A104 and the abutting plate A105. In the case in which the abutting plate A105 is disposed at a position that can abut the engaging rod 215 disposed in the main car 2 and the main operation platform A10 is positioned at the highest point and abuts the stopper A152, the positional relationship is adjusted such that the abutting position between the abutting plate A105 and the engaging rod 215 is lower than the hinge A109.

The sequence of actions in which the main operation platform apparatus A1 that has the structure described above is used and the main car 2 that uses the main operation platform A10 will be explained with reference to FIG. 16 to FIG. 19.

First, as shown in FIG. 16, the main car 2 moves in the direction of the arrow 2*a*, and when the main car 2 has reached the side of the operation start position Ms, that is, at the side of the main operation platform A10 that is positioned at the lowest point of the main operation platform apparatus A1, as shown in FIG. 17 and FIG. 18, the engaging rod 215 described above abuts the abutting plate A105 of the main operation platform A10, and subsequently, interlocks with the movement of the main car 2, and the main operation platform A10 moves forward.

In addition, when the main car 2 and the main operation platform A10 are side-by-side, a predetermined main operation is started by using the space on this main operation platform A10. There are various operations that can be carried out, such as an operation in which a part that is incorporated into a workpiece is assembled while moving and this part is installed in the workpiece after the assembly has been completed, or an operation in which a continuously used jig is permanently placed on the main operation platform A10, and this jig is used to carry out the operation on the main operation platform A10. At least in the case in which an operation in which an operation is more advantageously carried out by using an external space rather than being carried out in the main car 2, it is possible to advantageously use the space on the main operation platform A10 while moving synchronously with the main car 2.

In the main car 2, the main operations are carried out while moving by using the space on the main operation platform A10 described above. The main operations are carried out so as to be completed when or by the time that the main operation platform A10 that is moving in synchrony with the main car 2 has reached the highest point. Then, when or by the time that the main operation platform A10 that is moving in synchrony with the main car 2 has reached the highest point, the space of the main operation platform A10 is returned to the initial state.

As shown in FIG. 18 and FIG. 19, when the main operation platform A10 that is moving in synchrony with the main car 2 has reached the operation completion position Mr, which is the highest point, and abuts the stopper A152, the engaging rod 215 of the main car 2, which has moved farther forward, presses and rotates the abutting plate A105 by overcoming the resistance of the spring A108, and the engagement is released. Thereby, as shown in FIG. 19, the main operation platform A10 moves under its own weight from the operation completion position Mr, which is at the highest point, to the operation start position Ms, which is at the lowest point, and returns to the standby state.

Due to such a sequence of movements, the main car 2, which is continuously circulating, effectively uses the space on the main operation platform A10, and can smoothly carry out the main operation while moving. In addition, after this specific main operation has ended, the main operation platform A10 can easily return to the original position for the main car 2 that will transit next. Thus, it is possible to implement the cell manufacturing method extremely smoothly.

Note that it is possible to use a structure similar to that described above for the subsidiary operation platform apparatus B1 that is used by the subsidiary car 2 as well. In this case, for example, as shown in FIG. 16, the subsidiary car 4, which moves in the direction of the arrow 4*a*, and the main operation platform A10, which functions as the subsidiary operation platform, may be moved by a mechanism similar to that described above. In the exemplary embodiments below as well, similarly a structure explained as the main operation platform apparatus can be adopted as a subsidiary operation platform apparatus.

Figure 20:
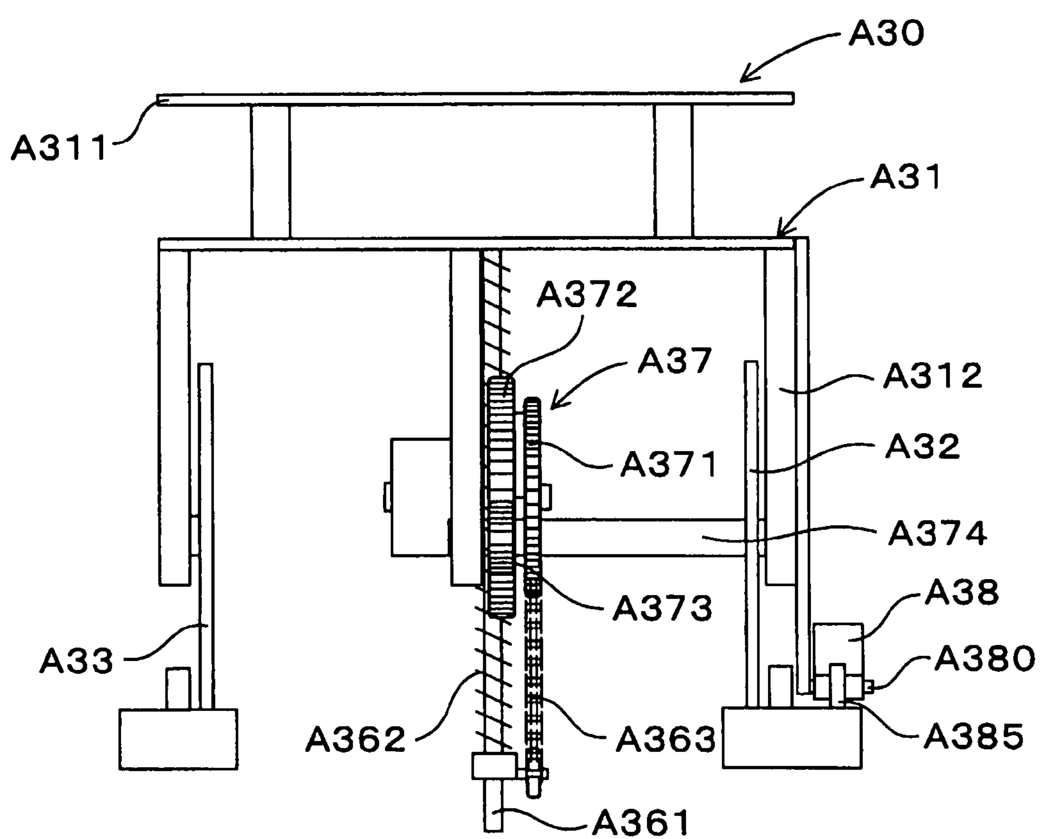
FIG. 20 is a frontal drawing showing the structure of the energy storing-type main operation platform according to an exemplary embodiment.
Figure 21:
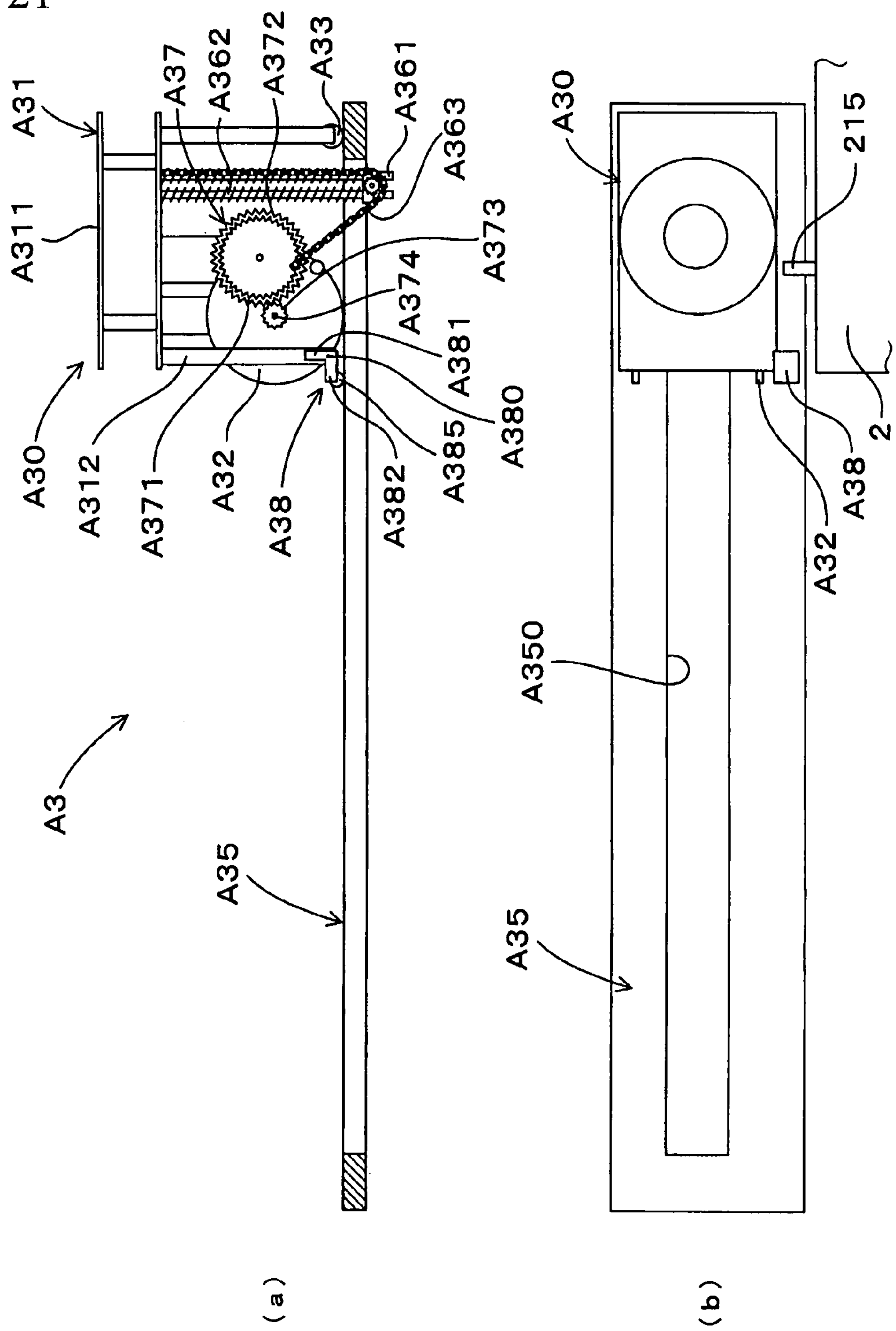
FIG. 21 is (a) a side view that shows the energy storing-type main operation platform apparatus, and (b) is a planar view that shows the energy storing-type main operation platform apparatus according to an exemplary embodiment.
Figure 22:
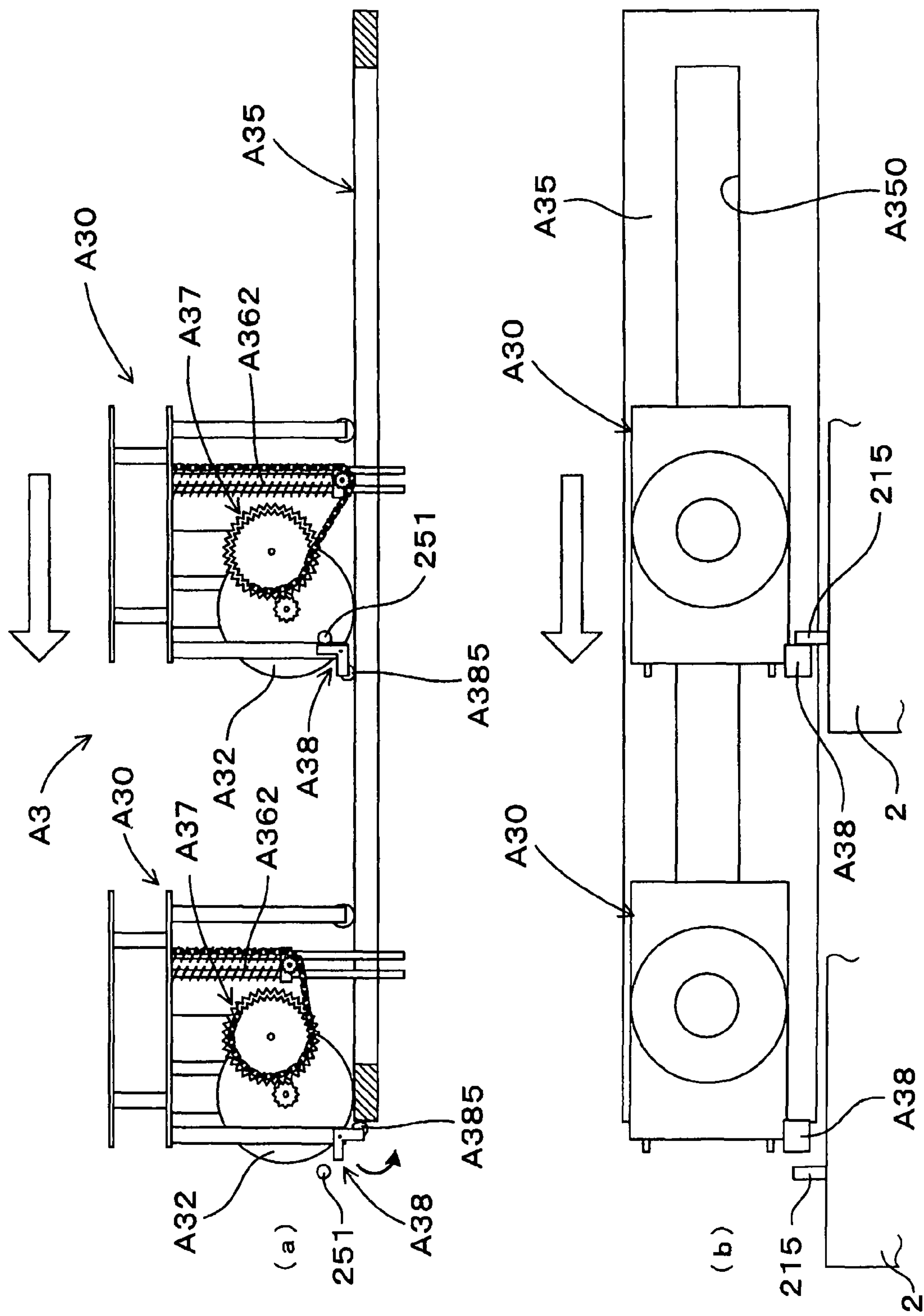
FIG. 22 is (a) a side view that shows the state in which the main operation platform is moving forward, and (b) a planar view that shows the state in which the main operation platform is moving forward according to an exemplary embodiment.

In accordance with a further exemplary embodiment of the present invention, the main operation platform apparatus A3 can be used when carrying out an operation similar to the case in which the main operation ML2 in FIG. 3 described above is carried out. As shown in FIG. 20 to FIG. 22, this main operation platform apparatus A3 is an energy storing-type delivery apparatus.

As shown in FIG. 20 and FIG. 21, the main operation platform A30 that is used in the main operation platform apparatus A30 includes energy storing means that stores energy accompanying movement and kinetic energy converting means that converts the energy that has been stored by the energy storing means into kinetic energy that acts in a direction opposite to that of this motion. In addition, the path A35 in the main operation platform apparatus A3 is disposed horizontally, and in the center portion thereof, a through hole A350 is provided in order to dispose a guide pole A361 of the main operation platform A30, which will be described below.

As shown in the figures, the main operation platform A30 includes a frame portion S31 that includes a top plate A311, legs A312, and the like, a drive wheel A32, and a plurality of supporting wheels A33 that can rotate freely. In addition, the energy storing means and the kinetic energy converting means are structured by a spring A362 that is disposed along the guide pole A361 and a gear set A37 that is linked via a chain A363 that is connected to the bottom end thereof. The gear set A37 is formed by a gear A371, around which a chain A363 is wrapped, and gears A372 and A373, which rotate by being linked thereto. A drive shaft A374, on which the gear A373 is provided, is linked to the drive wheel S32.

Furthermore, the main operation platform A30 includes a substantially L-shaped abutting member A38 that can engage the engaging rod 215 that is provided on the main car 2 on the bottom end of the leg A312. The abutting member A38 includes a first piece A381 and a second piece A382, and these are disposed so as to be able to rotate centered on the hinge A380. The standby wheel A385 that it able to freely rotate is disposed on the distal end of the second piece A382, and normally the standby wheel S385 abuts the path A35.

In addition, because the main operation platform A30 moves along the horizontal path A35 described above, the height thereof and the height of the main car 2 will always coincide.

Next, the movement of the main operation platform A30 will be explained.

As shown in FIG. 21 and FIG. 22, when the main operation platform A30 is linked to and moves in synchrony with the main car 2 from the start point to the end point, first, the linking rod 215 of the main car 2 abuts the first piece A381 of the abutting member A38 of the main operation platform A30. At this time, because the standby wheel A385 of the abutting member A38 abuts the path, the abutting relationship between the abutting member A38 and the linking rod 215 is maintained. Thereby, the forward movement force of the main car 2 is transferred to the main operation platform A30, and both move forward in synchrony.

As shown in FIG. 22, as the main operation platform A30 moves forward, the drive wheel A32 rotates, the gear set A37 that is linked thereto also rotates, and the spring A362 is compressed via the chain A363. That is, energy is stored in the spring A362, which serves as energy storing means.

When the main operation platform A30 has reached the end point of the path A35, the standby wheel A385 of the abutting member A38 is separated from the path A35, and rotates forward. Thereby, the engagement between the engaging rod 215 of the main car 2 and the abutting member A38 is released, and the forward movement of the main operation platform A30 stops. Then the main operation platform A30 begins to release the energy that has been stored by the spring A362 due to the link with the main car 2 being released. Thereby, the drive wheel A32 is driven by the kinetic energy converting means such as the gear set A37, which stores energy, and the main operation platform A30 is moved forward to the original position (start point).

In this manner, because the delivery apparatus A3 includes the main operation platform A30 that is provided with the energy storing means and the kinetic energy converting means described above, it is possible to act similarly to the type of delivery apparatus that uses the inclined path described above. Thus, in each of the embodiments described above, the main car 2 that continuously moves can effectively use the space on the main operation platform A20, and can more smoothly carry out the main operation while moving. In addition, after this specific main operation has completed, the main operation platform A30 can easily return to the original position for the main car 2 that transits next. Thus, the cell manufacturing method can be implemented extremely smoothly.

The previous description of the exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

The invention claimed is:

1. A cell manufacturing method in which a main operator, who carries out main operations that include a plurality of steps in which parts are installed on a workpiece, is moved along with the workpiece so as to transit a plurality of stations at which auxiliary steps related to the main operations are carried out, the method comprising:

providing a main car on which the workpiece is mounted and a main operator rides, and that automatically travels along a predetermined travel route that transits the plurality of stations; and providing a main operation platform apparatus that is a type of station which moves a main operation platform for carrying out at least one of the main operations;

then when at least a portion of the at least one of the main operations is carried out in the main car, the main car and the main operation platform are moved in synchrony.

2. The cell manufacturing method according to claim 1, further comprising:

providing a subsidiary car on which a subsidiary operator rides, the subsidiary operator carrying out subsidiary operations in which at least one of a part and a jig that is necessary for the at least one of the main operations is prepared;

then the main car and the subsidiary car travel together so as to be able to transfer the at least one of the part and the jig between the main car and the subsidiary car.

3. The cell manufacturing method according to claim 2, further comprising using a subsidiary operation platform apparatus that is a type of station which moves a subsidiary operation platform for carrying out at least one of the subsidiary operations;

then when at least a portion of the at least one of the subsidiary operations is carried out in the subsidiary car, the subsidiary car and the subsidiary operation platform are moved in synchrony.

4. A cell manufacturing method in which a main operator, who carries out main operations including a plurality of steps in which parts are installed on a workpiece, is moved along with the workpiece so as to transit a plurality of stations at which auxiliary steps related to the main operation are carried out, the method comprising:

providing a main car on which the workpiece is mounted and a main operator rides, and that automatically travels along a predetermined travel route that transits the plurality of stations;

providing a subsidiary car on which a subsidiary operator rides, the subsidiary operator carrying out subsidiary operations in which at least one of a part and a jig that is necessary for at least one of the main operations is prepared; and a subsidiary operation platform apparatus that is a type of station that is able to move a subsidiary operation platform for carrying out at least one of the subsidiary operations;

then when at least a portion of the at least one of the subsidiary operations is carried out at the subsidiary car, the main car and the subsidiary operation platform are moved in synchrony, and the main car and the subsidiary car travel together so as to be able to transfer the at least one of the part and the jig between the main car and the subsidiary car.

5. A cell manufacturing facility in which a main operator, who carries out main operations including a plurality of steps in which parts are installed on a workpiece, is moved along with the workpiece so as to transit a plurality of stations at which auxiliary steps related to the main operations are carried out, the cell manufacturing facility comprising:

a main car that is provided with a workpiece holding portion that holds the workpiece and a riding portion that the main operator can ride so as to be able to carry out operations on the workpiece that is held by the workpiece holding portion, the main car comprises a travel control apparatus that controls a travel state of the main car, and that automatically travels on a predetermined travel route that transits the plurality of stations; and a main operation platform apparatus that is a type of station able to move a main operation platform for carrying out at least one of the main operations, wherein when at least a portion of the at least one of the main operations is carried out in the main car, the main car and the main operation platform are configured to be moved in synchrony.

6. The cell manufacturing facility according to claim 5, wherein:

the main operation platform is disposed to move on an inclined path that inclines such that a height of the path decreases as an operation start position is approached from an operation completion position; and the main operation platform is linked to and moves in synchrony with the main car from the operation start position to the operation completion position, and the main operation platform returns to the operation start position by moving along the inclined path under its own weight by releasing the link with the main car at the operation completion position, and stands by.

7. The cell manufacturing facility according to claim 5, wherein:

the main operation platform includes energy storing means that stores energy accompanying movement of the main operation platform from an operation start position to an operation completion position and kinetic energy converting means that converts the energy that has been stored by the energy storing means into kinetic energy that acts on the main operation platform from the operation completion position to the operation start position; wherein the main operating platform is linked to and moves in synchrony with the main car from the operation start position to the operation completion position, energy is stored by the energy storing means, and the main operation platform returns from the main completion position due to the kinetic energy, by releasing the link with the main car at the operation completion position, and stands by.

8. The cell manufacturing facility according to claim 7, wherein the subsidiary operation platform stands by at an operation start position, the subsidiary operation platform moves in synchrony with the subsidiary car after the subsidiary car has reached the operation start position, and the subsidiary operation platform returns to the operation start position when the subsidiary car and the subsidiary operation platform have reached an operation completion position, and stands by.

9. The cell manufacturing facility according to claim 7, wherein:

the subsidiary operation platform is disposed to move on an inclined path that is inclined such that a height of the path decreases as an operation start position is approached from an operation completion position; and the subsidiary operation platform is linked to and moves in synchrony with the subsidiary car from the operation start position to the operation completion position, and the subsidiary operation platform returns to the operation start position by moving along the inclined path under its own weight by releasing the link with the subsidiary car at the operation start position, and stands by.

10. The cell manufacturing facility according to claim 7, wherein:

the subsidiary operation platform comprises an energy storing means that stores the energy accompanying the movement of the subsidiary operation platform from the operation start position to the operation completion position and a kinetic energy converting means that converts the energy that has been stored by the energy storing means into kinetic energy that acts on the subsidiary operation platform from the operation completion position to the operation start position; and the subsidiary operation platform is linked to and moves in synchrony with the subsidiary car from the operation start position and the operation completion position, energy is stored by the energy storing means, and the subsidiary operation platform returns to the operation start position due to the kinetic energy, by releasing the link with the subsidiary car at the operation completion position, and stands by.

11. The cell manufacturing facility according to claim 5, further comprising:

a subsidiary car on which a subsidiary operator rides, the subsidiary operator carrying out subsidiary operations in which at least one of a part and a jig that is necessary for the main operations is prepared;

wherein the main car and the subsidiary car can travel together so as to be able to transfer the at least one of the part and the jig between the main car and the subsidiary car.

12. The cell manufacturing facility according to claim 11, further comprising:

a subsidiary operation platform apparatus that is a type of station able to move a subsidiary operation platform for carrying out the subsidiary operations;

wherein when at least a portion of at least one of the subsidiary operations is carried out at the subsidiary car, the subsidiary car and the subsidiary operation platform can be moved in synchrony.

13. The cell manufacturing facility according to claim 11, wherein the main operation platform apparatus is structured such that the main operation platform stands by at an operation start position, the main operation platform moves in synchrony with the main car after the main car has reached the operation start position, and the main operation platform returns to the operation start position when the main car and main operation platform have reached an operation completion position, and stands by.

14. The cell manufacturing facility according to claim 11, wherein:

the main operation platform is disposed to move on an inclined path that inclines such that a height of the path decreases as an operation start position is approached from an operation completion position; and the main operation platform is linked to and moves in synchrony with the main car from the operation start position to the operation completion position, and the main operation platform returns to the operation start position by moving along the inclined path under its own weight by releasing the link with the main car at the operation completion position, and stands by.

15. The cell manufacturing facility according to claim 11, wherein:

the main operation platform includes energy storing means that stores energy accompanying movement of the main operation platform from an operation start position to an operation completion position and kinetic energy converting means that converts the energy that has been stored by the energy storing means into kinetic energy that acts on the main operation platform from the operation completion position to the operation start position; wherein the main operating platform is linked to and moves in synchrony with the main car from the operation start position to the operation completion position, energy is stored by the energy storing means, and the main operation platform returns from the main completion position due to the kinetic energy, by releasing the link with the main car at the operation completion position, and stands by.

16. The cell manufacturing facility according to claim 5, wherein the main operation platform apparatus is structured such that the main operation platform stands by at an operation start position, the main operation platform moves in synchrony with the main car after the main car has reached the operation start position, and the main operation platform returns to the operation start position when the main car and main operation platform have reached an operation completion position, and stands by.

17. The cell manufacturing facility according to claim 12, wherein the main operation platform apparatus is structured such that the main operation platform stands by at an operation start position, the main operation platform moves in synchrony with the main car after the main car has reached the operation start position, and the main operation platform returns to the operation start position when the main car and main operation platform have reached an operation completion position, and stands by.

18. The cell manufacturing facility according to claim 12, wherein:

the main operation platform is disposed so as to be able to move on an inclined path that inclines such that a height of the path decreases as an operation start position is approached from an operation completion position; and the main operation platform is linked to and moves in synchrony with the main car from the operation start position to the operation completion position, and the main operation platform returns to the operation start position by moving along the inclined path under its own weight by releasing the link with the main car at the operation completion position, and stands by.

19. The cell manufacturing facility according to claim 12, wherein:

the main operation platform includes energy storing means that stores energy accompanying the movement of the main operation platform from an operation start position to an operation completion position and kinetic energy converting means that converts the energy that has been stored by the energy storing means into kinetic energy that acts on the main operation platform from the operation completion position to the operation start position; wherein the main operating platform is linked to and moves in synchrony with the main car from the operation start position to the operation completion position, energy is stored by the energy storing means, and the main operation platform returns from the main completion position due to the kinetic energy, by releasing the link with the main car at the operation completion position, and stands by.

20. The cell manufacturing facility according to claim 12, wherein the subsidiary operation platform stands by at an operation start position, the subsidiary operation platform moves in synchrony with the subsidiary car after the subsidiary car has reached the operation start position, and the subsidiary operation platform returns to the operation start position when the subsidiary car and the subsidiary operation platform have reached an operation completion position, and stands by.

21. The cell manufacturing facility according to claim 12, wherein:

the subsidiary operation platform is disposed to move on an inclined path that is inclined such that a height of the path decreases as an operation start position is approached from an operation completion position; and the subsidiary operation platform is linked to and moves in synchrony with the subsidiary car from the operation start position to the operation completion position, and the subsidiary operation platform returns to the operation start position by moving along the inclined path under its own weight by releasing the link with the subsidiary car at the operation start position, and stands by.

22. The cell manufacturing facility according to claim 12, wherein:

the subsidiary operation platform comprises an energy storing means that stores the energy accompanying the movement of the subsidiary operation platform from an operation start position to an operation completion position and a kinetic energy converting means that converts the energy that has been stored by the energy storing means into kinetic energy that acts on the subsidiary operation platform from the operation completion position to the operation start position; and the subsidiary operation platform is linked to and moves in synchrony with the subsidiary car from the operation start position and the operation completion position, energy is stored by the energy storing means, and the subsidiary operation platform returns to the operation start position due to the kinetic energy, by releasing the link with the subsidiary car at the operation completion position, and stands by.

23. A cell manufacturing facility in which a main operator, who carries out main operations including a plurality of steps in which parts are installed on a workpiece, is moved along with the workpiece so as to transit a plurality of stations at which auxiliary steps related to the main operations are carried out, the facility comprising:

a main car that is provided with a workpiece holding portion that holds the workpiece and a riding portion that the main operator can ride so as to be able to carry out operations on the workpiece that is held by the workpiece holding portion, and that is provided with a travel control apparatus that controls the travel state, and that automatically travels on a travel route that transits the plurality of stations; and a subsidiary car on which a subsidiary operator rides, the subsidiary operator carrying out subsidiary operations in which at least one of a part and a jig that is necessary for at least one of the main operations is prepared; and a subsidiary operation platform apparatus that is a type of station provided to move a subsidiary operation platform for carrying out the subsidiary operations;

then when at least a portion of at least one of the subsidiary operations is carried out at the subsidiary car, the subsidiary car and the subsidiary operation platform are moved in synchrony, and the main car and the subsidiary car travel together so as to be able to transfer the at least one of the part and the jig between the main car and the subsidiary car.

* * * * *